(12) United States Patent
Miura et al.

(10) Patent No.: US 8,981,722 B2
(45) Date of Patent: Mar. 17, 2015

(54) CELL CONTROL DEVICE AND ELECTRICITY STORAGE DEVICE INCORPORATING THE SAME

(75) Inventors: Hikaru Miura, Hitachinaka (JP); Akihiko Kudo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 736 days.

(21) Appl. No.: 13/333,431

(22) Filed: Dec. 21, 2011

(65) Prior Publication Data

US 2012/0161708 A1    Jun. 28, 2012

(30) Foreign Application Priority Data

Dec. 22, 2010 (JP) .................................. 2010-285846

(51) Int. Cl.
*H02J 7/00* (2006.01)
*B60L 11/18* (2006.01)
*B60L 3/00* (2006.01)
(Continued)

(52) U.S. Cl.
CPC ........... *B60L 11/1866* (2013.01); *B60L 3/0084* (2013.01); *B60L 7/14* (2013.01);
(Continued)

(58) Field of Classification Search
USPC ................................................. 320/118–119
See application file for complete search history.

(56) References Cited

U.S. PATENT DOCUMENTS

| | | |
|---|---|---|
| 2003/0146737 A1 | 8/2003 | Kadouchi et al. |
| 2005/0266303 A1 | 12/2005 | Kadouchi et al. |
| 2011/0234162 A1 | 9/2011 | Kinoshita et al. |

FOREIGN PATENT DOCUMENTS

| | | |
|---|---|---|
| JP | 9-285027 A | 10/1997 |
| JP | 10-32936 A | 2/1998 |
| JP | 2003-219572 A | 7/2003 |

(Continued)

*Primary Examiner* — Edward Tso
*Assistant Examiner* — Robert Grant
(74) *Attorney, Agent, or Firm* — Crowell & Moring LLP

(57) ABSTRACT

A cell control device according to the present invention includes: a discharge circuit that discharges each unit cell selected by the first switches among a plurality of unit cells connected in series; a charging circuit that charges each unit cell selected by the second switches among the unit cells connected in series, and; a voltage detection unit that detects a voltage of each unit cell via voltage detection lines respectively connected to positive and negative electrodes of the unit cells; an oscillator that irradiates high frequency electromagnetic radiation upon the voltage detection lines; and a charging control unit that controls switching of the first switches, thereby performing discharge of the each unit cell, and a charging control unit that controls switching of the second switches, thereby performing charging of the unit cells, based on voltages of the unit cells that are detected by the voltage detection unit.

11 Claims, 17 Drawing Sheets

(51) Int. Cl.
  *B60L 7/14*   (2006.01)
  *B60L 11/14*  (2006.01)
(52) U.S. Cl.
  CPC ............ *B60L 11/14* (2013.01); *B60L 11/1861* (2013.01); *B60L 11/1868* (2013.01); *H02J 7/0019* (2013.01); *Y02T 10/7005* (2013.01); *Y02T 10/92* (2013.01); *B60L 2240/547* (2013.01); *Y02T 10/7061* (2013.01); *Y02T 10/7055* (2013.01); *B60L 2210/10* (2013.01); *B60L 2210/40* (2013.01); *B60L 2220/14* (2013.01); *B60L 2240/545* (2013.01); *B60L 2240/549* (2013.01); *B60L 2240/80* (2013.01); *B60L 2270/20* (2013.01); *Y02T 10/7077* (2013.01); *Y02T 10/7044* (2013.01); *Y02T 10/7241* (2013.01); *Y02T 10/7066* (2013.01); *Y02T 10/7216* (2013.01); *B60L 2200/26* (2013.01)
  USPC .......................................... 320/118; 320/119

(56) References Cited

FOREIGN PATENT DOCUMENTS

| | | |
|---|---|---|
| JP | 2005-348457 A | 12/2005 |
| JP | 2009-159672 A | 7/2009 |
| JP | 2010-166800 A | 7/2010 |

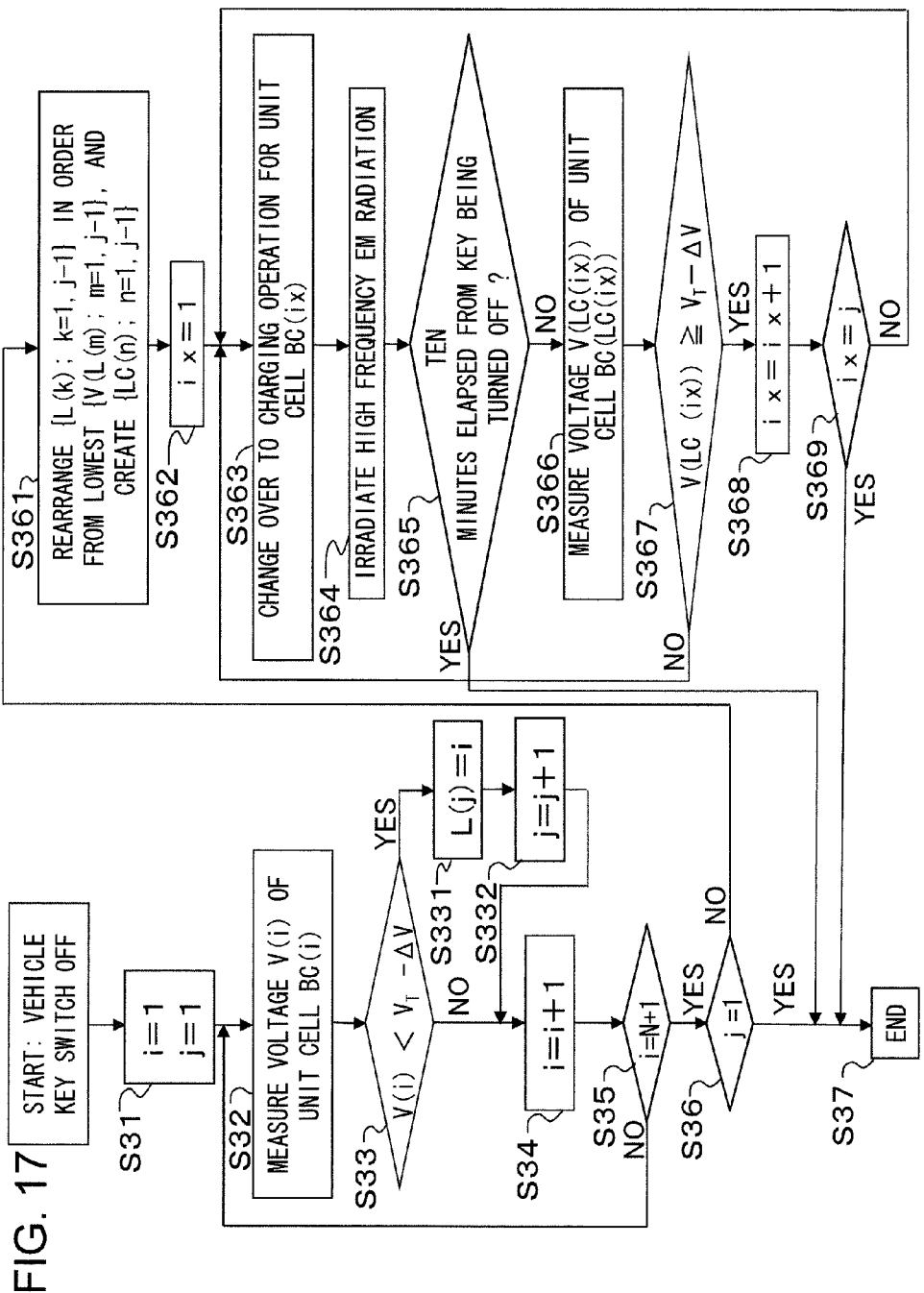

CELL CONTROL DEVICE AND ELECTRICITY STORAGE DEVICE INCORPORATING THE SAME

INCORPORATION BY REFERENCE

The disclosure of the following priority application is hereby incorporated herein by reference: Japanese Patent Application No. 2010-285846, filed Dec. 22, 2010.

BACKGROUND OF THE INVENTION

1. Field of the Invention

The present invention relates to a cell control device that controls the charging and discharging of cells in an electricity storage device, and to an electricity storage device that incorporates such a cell control device.

2. Description of the Related Art

In the prior art, a charging and discharging control system has been employed that controls a device for charging and discharging connected to the positive terminals and to the negative terminals of a cell group. Furthermore, with lithium ion batteries that have recently been implemented in practice, there is a possibility that a malfunction such as increase of the amount of heat generated or the like may take place if charging and discharging are not performed within an appropriate range of state of charge (SOC). Due to this, with an electricity storage device (a battery) that employs a number of lithium ion cells, a cell controller is utilized that performs cell balancing to equalize the SOCs of the various unit cells by measuring the voltage of each of the unit cells (lithium ion cells) making up the cell groups in this lithium ion battery, and by discharging the charge accumulated in certain ones of the unit cells in order to equalize the SOCs between all of the unit cells.

Furthermore, when variation in SOC between the unit cells is present, the capacity of the cell group for being charged and discharged becomes low, because the capacity for being charged is determined by those unit cells whose SOCs are the highest, while the capacity for being discharged is determined by those unit cells whose SOCs are the lowest. Moreover, although the SOC of a unit cell that has deteriorated and whose capacity has dropped increases due to charging faster than do the SOCs of the other unit cells, the deterioration accelerates further when charging is performed in the high SOC state. And, since the life of a cell group is determined by those cells that have deteriorated, accordingly variation in SOCs between the cells also shortens the life of the cell group.

As a cell balancing technique of this type, there is a per se known cell controller having a cell balancing circuit that adjusts the capacities of the various unit cells, including a cell voltage detection circuit that detects the voltage of each of the unit cells included in a cell group via voltage detection lines, resistors and switching elements for cell balancing, and a control unit that controls turning the switching elements on and off. (For example, reference should be made to Japanese Laid-Open Patent Publication 2005-348457.)

The cell controller described in Japanese Laid-Open Patent Publication 2005-348457 performs balancing by controlling balancing circuits of the type described above. In other words, it operates the balancing circuits so that the differences in SOC become smaller. This balancing operation is performed during charging and discharging of the entire assembled battery. During discharge of the entire assembled battery, the unit cells for which the balancing circuits operate have a higher proportion of balancing current in the discharge current than the unit cells for which the balancing circuits do not operate.

Moreover, during charging of the entire assembled battery, the charge current for the unit cells for which the balancing circuits operate is reduced by amount of the discharge current, compared with those unit cells for which the balancing circuits do not operate. Accordingly, if the number of unit cells in the cell group whose SOCs have decreased is small, then the entire assembled battery is charged and discharged while performing balancing discharging on the remaining large number of unit cells whose SOC has not decreased, and thereby the SOC of the entire cell group is controlled to reach a target value.

SUMMARY OF THE INVENTION

For an electricity storage device including a cell group made up of a plurality of unit cells, the energy losses are high with prior art balancing techniques for equalizing variations of SOC between the various unit cells, because the operation of the balancing circuit is performed upon those ones of the unit cells whose SOCs have not decreased.

According to the 1st aspect of the present invention, a cell control device, comprises: a discharge circuit, comprising first switches that select each of a plurality of unit cells that are connected in series, and that discharges the each unit cell selected by the first switches; a charging circuit, comprising second switches that select each of the plurality of unit cells that are connected in series, and that charges the each unit cell selected by the second switches; a voltage detection unit that detects a voltage of each unit cell via voltage detection lines respectively connected to positive electrodes and to negative electrodes of the plurality of unit cells; an oscillator that irradiates high frequency electromagnetic radiation upon the voltage detection lines; and a discharge control unit that controls opening and closing of the first switches, thereby performing discharge of the each unit cell, and a charging control unit that controls opening and closing of the second switches, thereby performing charging of the each unit cell, based on voltages of the plurality of the unit cells that are detected by the voltage detection unit.

According to the 2nd aspect of the present invention, in a cell control device according to the 1st aspect, it is preferred that, for a unit cell for which it has been detected by the voltage detection circuit that the voltage of the unit cell is greater than a target value, the discharge control unit performs discharge while closing one of the first switches that corresponds to the unit cell whose voltage is greater than the target value; and, when there is a unit cell whose voltage detected by the voltage detection circuit is less than a target value, the charging control unit drives the oscillator, opens one of the first switches that corresponds to the unit cell whose voltage is less than the target value, closes the one of the second switches that corresponds to that unit cell, and charges up that unit cell.

According to the 3rd aspect of the present invention, a cell control device according to the 1st or 2nd aspect further comprises: a protective circuit comprising third switches that select each of the plurality of unit cells, and that protects the each unit cell selected by the third switches; and wherein, when charging up the each unit cell, the charging control unit performs charging by opening the third switches.

According to the 4th aspect of the present invention, in a cell control device according to any one of the 1st through 3rd aspects, it is preferred that the cell control device further comprises a cell controller that includes the voltage detection unit and the discharge control unit, and that controls the voltage detection unit and the discharge control unit; and, when the charging control unit is charging the each unit cell, the cell controller performs charging by closing the first switches corresponding to the each unit cell According to the 5th aspect of the present invention, in a cell control device according to the 4th aspect, it is preferred that the cell controller controls the charging control unit.

According to the 6th aspect of the present invention, in a cell control device according to any one of the 1st through 3rd aspects, it is preferred that the cell control device further comprises a cell controller that includes the voltage detection unit and the discharge control unit, and that controls the voltage detection unit and the discharge control unit; the charging control unit is controlled by a higher ranking control device of the cell controller; and when the charging control unit is performing charging of the each unit cell, the cell controller is stopped.

According to the 7th aspect of the present invention, in a cell control device according to any one of the 1st through 6th aspects, it is preferred that the discharge of the each unit cell by the discharge control unit, and charging of the each unit cell by the charging control unit are performed in key switch OFF state when a vehicle to which the cell control device is mounted is stopped.

According to the 8th aspect of the present invention, in a cell control device according to any one of the 1st through 6th aspects, it is preferred that the discharge of the each unit cell by the discharge control unit is performed in key switch ON state when a vehicle to which the cell control device is mounted is stopped.

According to the 9th aspect of the present invention, in a cell control device according to any one of the 1st through 8th aspects, it is preferred that: voltages of all unit cells of the plurality of unit cells are detected, and among those unit cells whose voltages are greater than a target value, discharge is performed from a unit cell with greatest voltage.

According to the 10th aspect of the present invention, an electricity storage device comprises; a cell control device according to any one of the 1st through 9th aspects, the plurality of unit cells connected in series, and a metallic case containing the cell control device and the plurality of unit cells.

According to the 11th aspect of the present invention, a vehicle capable of traveling by electric driving comprises; an electricity storage device according to the 10th aspect, and an electric motor for driving that is powered by electrical power supplied from the electricity storage device.

BRIEF DESCRIPTION OF THE DRAWINGS

FIG. 17 is a flow chart for a variant embodiment of the charging operation of FIG. 16, when a cell control device that is endowed with a cell balancing function according to the present invention is employed.

DESCRIPTION OF THE PREFERRED EMBODIMENTS

In the following, an embodiment for implementation of the present invention will be explained with reference to FIGS. 1 through 12. In the embodiment explained below, a case is explained in which the cell control device and the electricity storage device according to the present invention are applied to a drive system for a hybrid automobile. However, it should be understood that the structure of the embodiment explained below could also be applied to a railroad vehicle such as a hybrid train or the like. Moreover, the cell control device and the electricity storage device according to the present invention could also be applied to an electric automobile.

Figure 3:
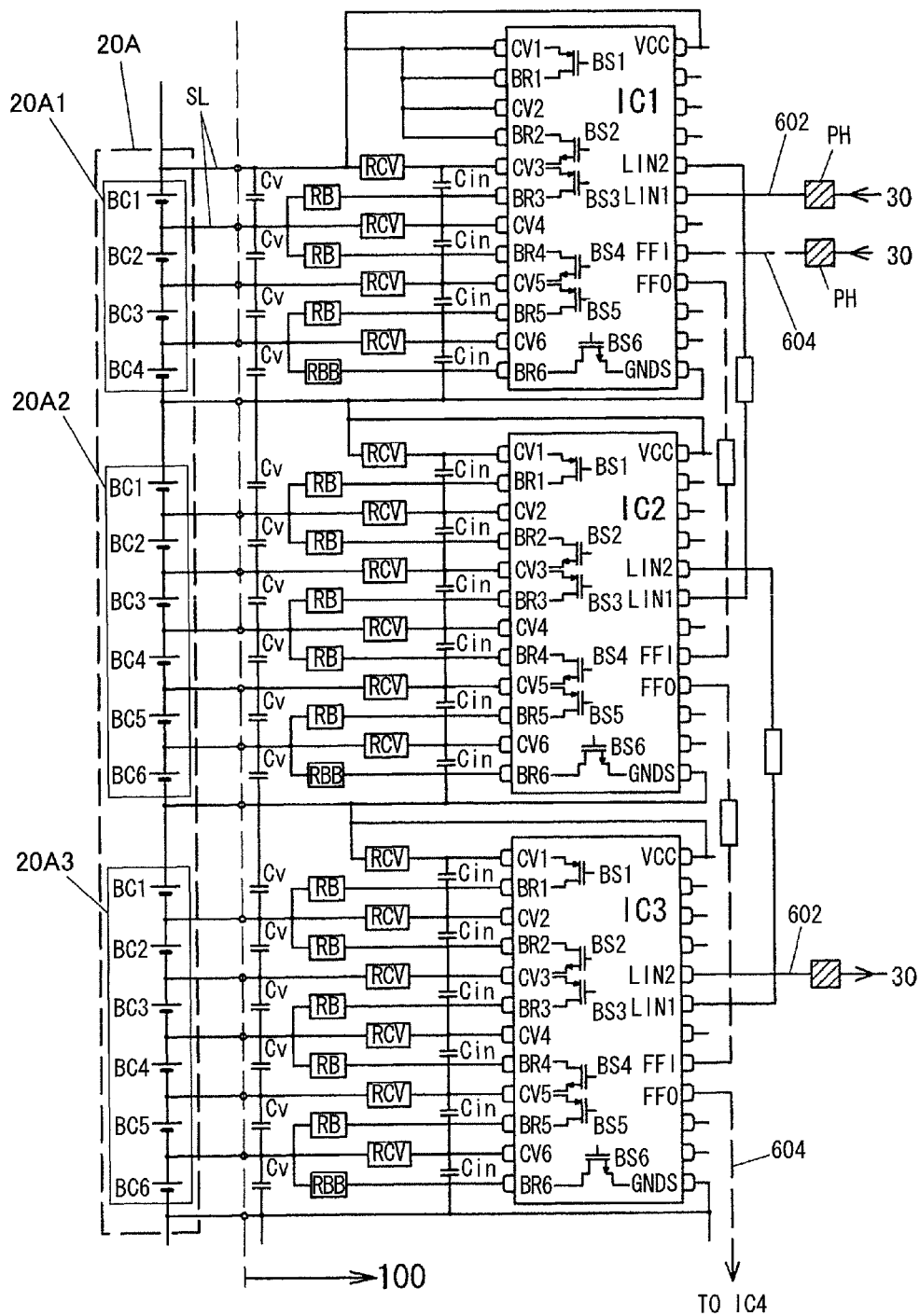
FIG. 3 is a schematic figure showing a portion in a prior art cell balancing circuit corresponding to a battery module block 20A of FIG. 2, that is common with the cell control device according to the present invention.
Figure 4:
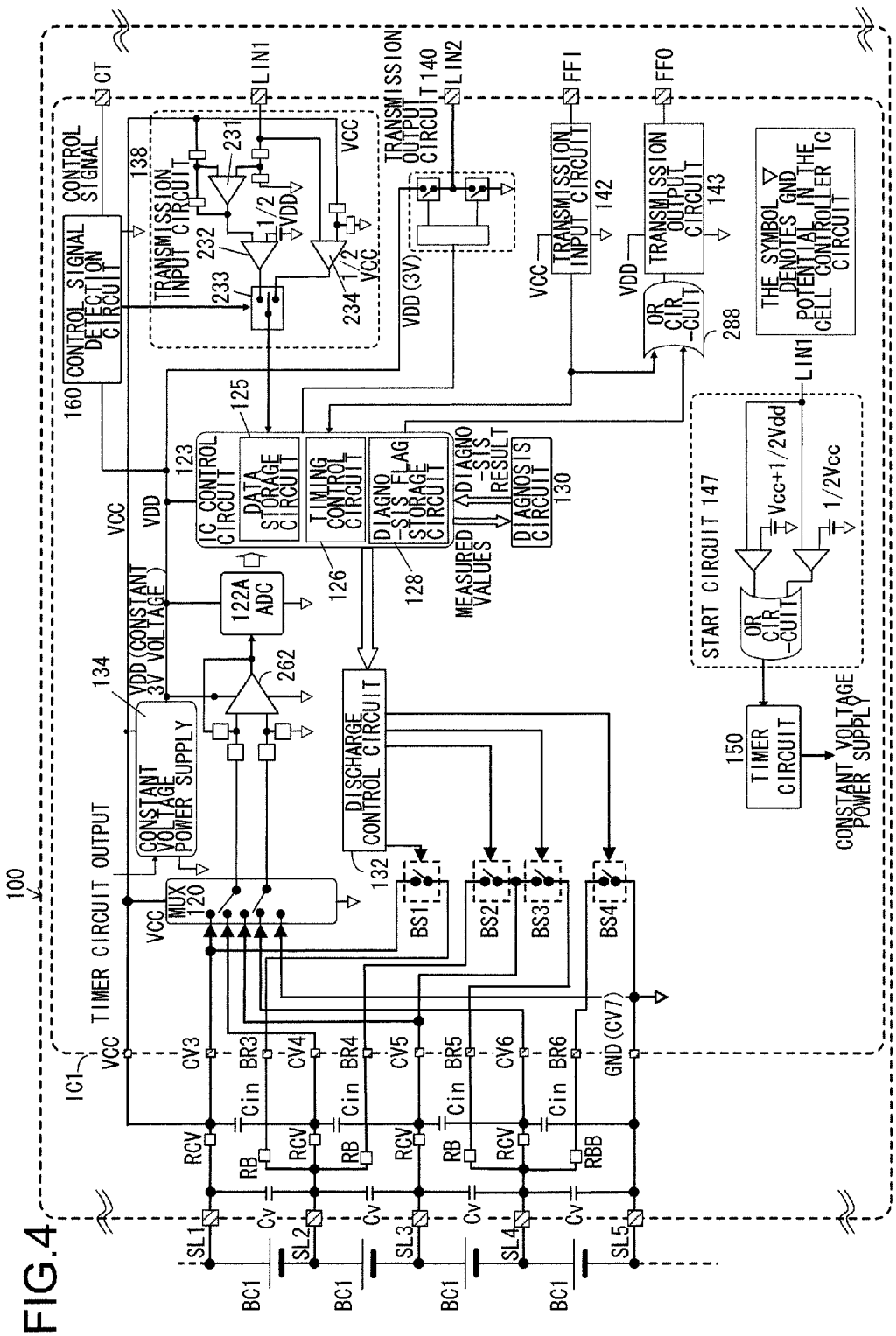
FIG. 4 is a schematic figure showing a portion corresponding to a cell group 20A1 of the battery module block 20A in the cell balancing circuit shown in FIG. 3, and the circuitry of a cell controller IC1 that controls a cell group 20A1.
Figure 5:
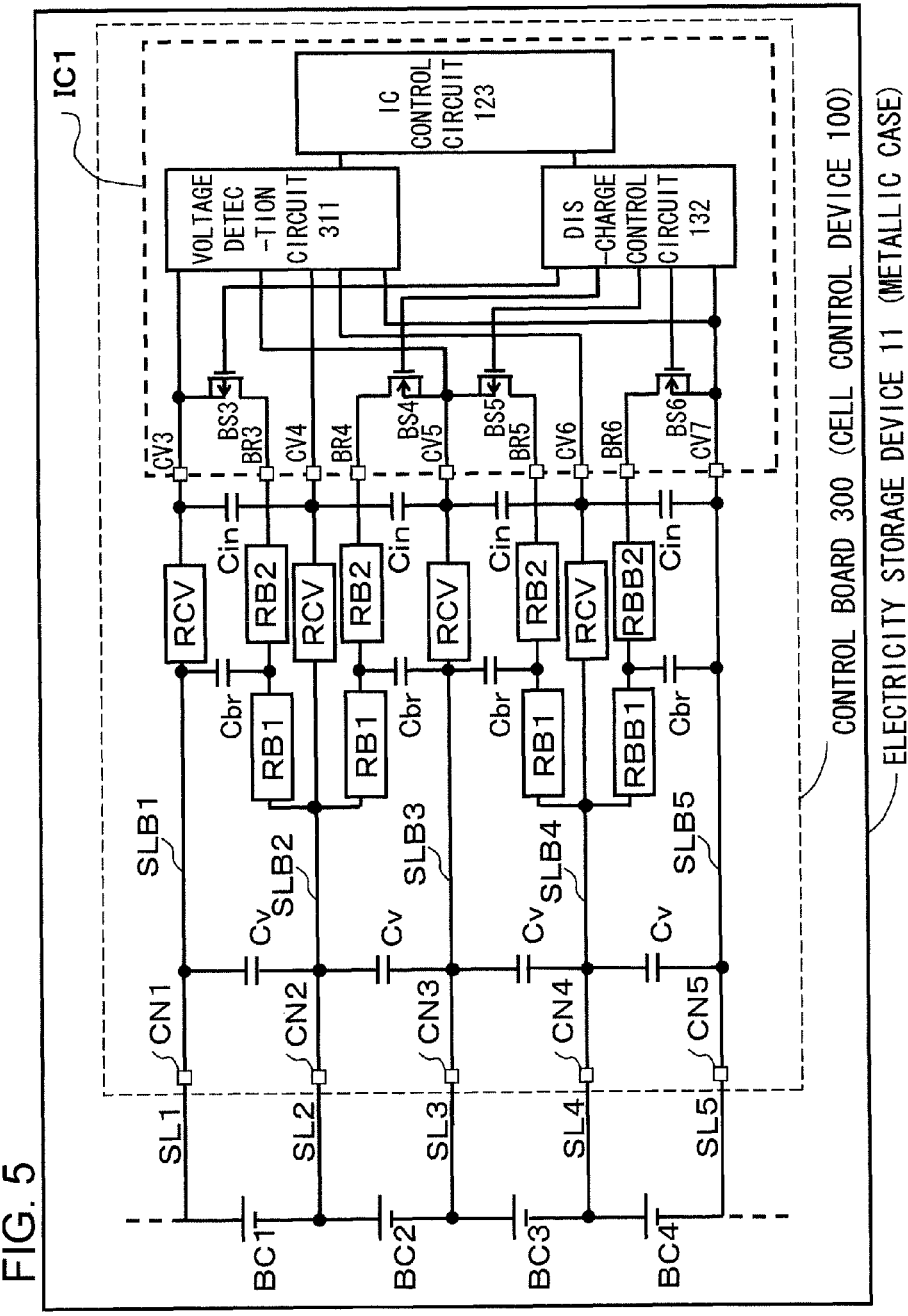
FIG. 5 is a schematic figure for comparison with the present invention, and shows the circuitry of FIG. 4 with the portions other than the cell balancing circuit omitted (here the balancing resistors are separated into two parts—refer to the text)

It should be understood that, in this specification, a group in which a plurality of unit secondary cells are connected in series will collectively be termed a "cell group". Generally, a plurality of cell groups that are connected in series, in parallel, or in series-parallel are collectively termed a "battery module", and the capacity of an electricity storage device can be further increased by incorporating a plurality of such battery modules. Moreover, it should be understood that the expression "assembled battery" is employed as a generic term for any cell group or battery module or the like in which a plurality of unit cells are connected together. The circuit diagrams shown in FIGS. 3 through 5 show circuits according to the prior art that are shared in common with the cell control device and the electricity storage device according to the present invention; and the aspects of operation that are common to the present invention and to the prior art will now be explained using these drawings.

—General Structure of a Drive System for a Hybrid Automobile—

First, a drive system for a hybrid automobile will be explained with reference to FIG. 1. In the drive system for a hybrid automobile shown in FIG. 1, wheel axles 3 to which drive wheels 2 are mechanically connected are connected to a differential gear 4, and the input shaft of the differential gear 4 is connected to a transmission 5. And, as sources of driving power, the driving power of an engine 6 (that is an internal combustion engine) and/or the driving power of a motor-generator 7 are inputted to the transmission 5 via a driving power changeover device 8.

Figure 1:
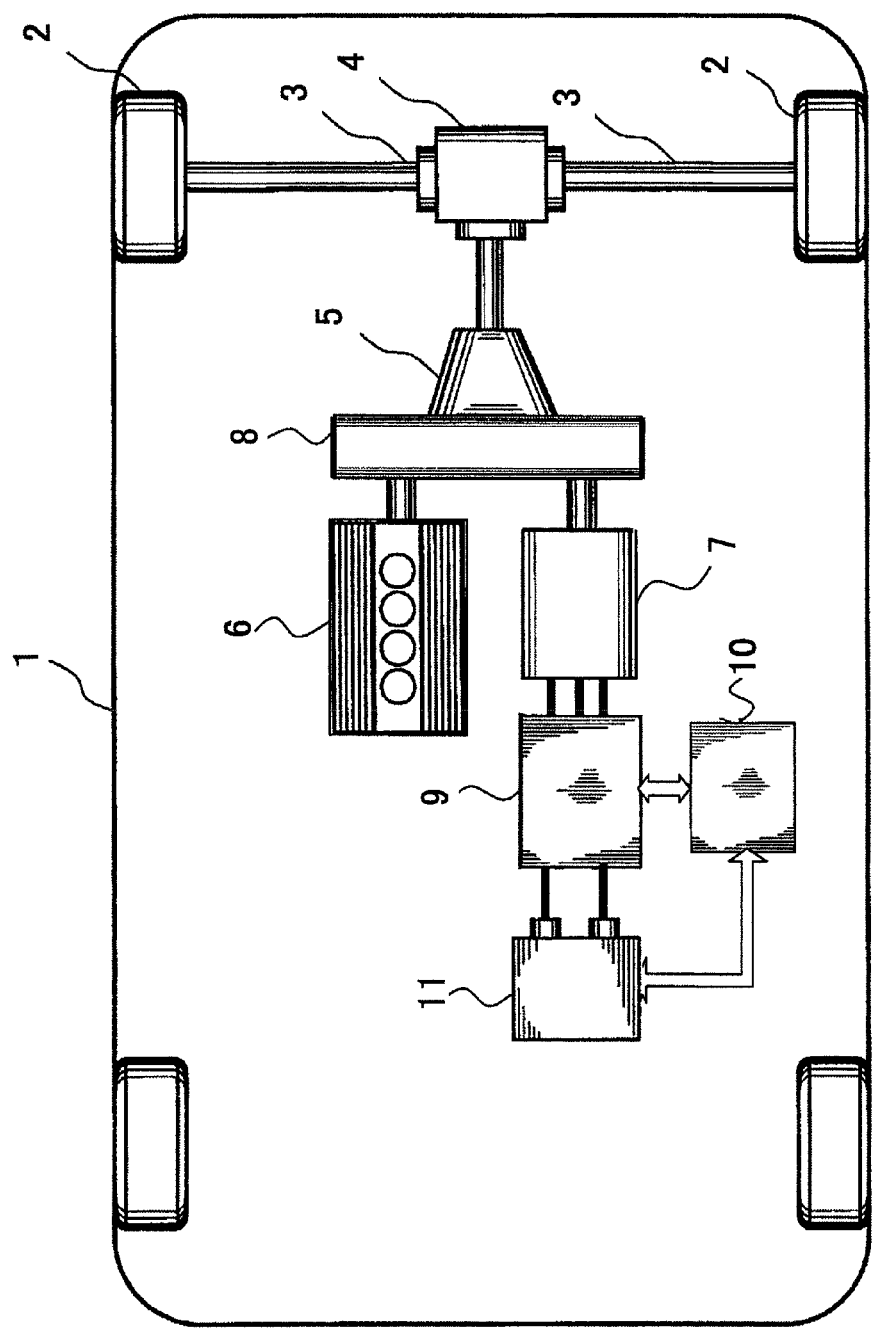
FIG. 1 is a figure showing an example of the overall structure of a hybrid automobile that is equipped with a cell control device and an electricity storage device according to the present invention.

In FIG. 1, the engine 6 and the motor-generator 7 are arranged in parallel as sources of driving power for the drive wheels 2, this being the so called parallel hybrid format. Furthermore, as a drive system for a hybrid automobile, there is also the so called serial hybrid format, in which it is arranged to use the energy of the motor-generator 7 as a source of driving power for the drive wheels 2, while charging up a source of energy for powering the motor-generator 7, in other words an electricity storage device, using the energy of the engine 6; and the present invention could also be applied to a vehicle of this type, or to a vehicle of a combined type.

An electricity storage device 11 is electrically connected to the motor-generator 7 via a power conversion device 9. This power conversion device 9 is controlled by the control device 10.

When the motor-generator 7 is operating as an electric motor, the power conversion device 9 functions as a DC-AC conversion circuit that converts DC power outputted from the electricity storage device 11 into three-phase AC power. Moreover, when the motor-generator 7 is operating as a generator during regenerative braking, the power conversion device 9 functions as an AC-DC conversion circuit that converts three-phase AC power outputted from the motor-generator 7 into DC power. Positive and negative terminals of the electricity storage device 11 are electrically connected to the DC side of the power conversion device 9. Three series circuits constitute the AC side of the power conversion device 9, each of them incorporating two switching semiconductor elements, and three windings of the armature winding of the motor-generator 7 for three phases of AC power are respectively electrically connected to points intermediate between the two switching semiconductor elements of each of these three series circuits.

The motor-generator 7 functions as a prime mover for driving the drive wheels 2, and is a synchronous rotating three-phase AC electrical machine of the permanent field magnet type that employs the magnetic flux of a permanent magnet as field system, and includes an armature (a stator) and a field magnet (a rotor) that is rotatably supported in a configuration facing the armature. And this motor-generator 7 generates the rotatory power required for driving the drive wheels 2 on the basis of the magnetic interaction of a rotating magnetic field that rotates at synchronous speed and that is created by the three-phase AC power supplied to the armature winding, and the magnetic flux of the permanent magnet.

When the motor-generator 7 is being operated as an electric motor, the armature receives supply of three phase AC power under the control of the power conversion device 9, and generates a rotating magnetic field. On the other hand, when the motor-generator 7 is being operated as a generator, the armature becomes a site at which three phase AC power is generated due to interlinking of the magnetic flux therewith: this armature includes an armature core (i.e. a stator core) that is made from a magnetic material such as iron, and armature windings (i.e. stator windings) for the three phases that are installed upon this armature core. And, when the motor-generator 7 is being operated in either manner, i.e. as an electric motor or as a generator, the field system is a site at which field magnetic flux is generated: this field system includes a field magnet core (i.e. a rotor core) that is made from a magnetic material such as iron, and a permanent magnet that is installed upon this field magnet core.

Alternatively, as the motor-generator 7, it would also be acceptable to employ a synchronous three phase AC rotating electrical machine with a field system of coil type that generates rotational power on the basis of the mutual magnetic interaction between a synchronously rotating magnetic field generated by three phase AC power supplied to the armature winding and a magnetic flux generated by excitation of the rotor coil, or an induction type three phase AC rotating electrical machine or the like. In the case of a synchronous three phase AC rotating electrical machine of the field winding magnet type, the structure of the armature is fundamentally the same as that of a permanent field magnet type three phase AC synchronous rotating electrical machine. On the other hand, the structure of the field magnet is different: it includes a field coil (i.e. a rotor winding) that is wound upon a field magnet core made from a magnetic material. It should be understood that, with a synchronous three phase AC rotating electrical machine of the field winding magnet type, in some cases, a permanent magnet is installed in the field magnet core upon which the field coil is wound, and this suppresses leakage of the magnetic flux created by the field coil to the exterior. The magnetic flux is generated by supplying a field coil current from an external power supply to the field coil, thus exciting it.

The wheel axles 3 of the drive wheels 2 are mechanically connected to the motor-generator 7 via the driving power changeover device 8, the transmission 5, and the differential gear 4. The transmission 5 changes the speed of the rotational power outputted from the motor-generator 7, and then transmits it to the differential gear 4. The differential gear 4 transmits the rotational power outputted from the transmission 5 to the axles of right and left wheels. The driving power changeover device 8 is changed over by a higher ranking control device such as an engine controller or a traveling controller or the like, and the operations such as accelerating travel by engine control, starting of the engine by the motor-generator 7 from idling stop, braking control during regenerative braking, and so on, are changed over, thus causing the motor-generator 7 to operate either as an electric motor for driving or as a generator for electricity generation, and also causing the engine 6 to drive the vehicle.

The electricity storage device 11 is an onboard power supply for driving that is charged up by the electrical power generated while the motor-generator 7 is performing regeneration (that later will be used for driving the same motor-generator 7), and that, while the motor-generator 7 is being driven as a motor, discharges the electrical power required for driving it. The electricity storage device 11 may be a battery system that includes several tens of unit cells such as, for example, lithium ion cells or the like, and that has a rated voltage of, for example, 100 V or greater. It should be understood that the detailed structure of this electricity storage device 11 will be described hereinafter.

Apart from the motor-generator 7, electrically operated actuators (such as, for example, a power steering system, an air brake, and so on) that are to be supplied with power and whose rated voltages are lower than the rated voltage of the electricity storage device 11, and a low voltage battery or the like that is a power accumulator for supplying electrical power to in-vehicle electrical and electronic equipment (such as, for example, lights, an audio system, onboard electronic control devices, and so on) are electrically connected to the electricity storage device 11 via a DC/DC converter. This DC/DC converter is a voltage step-up/down device that stepdowns the output voltage of the electricity storage device 11 and supplies it to the electrically operated actuators and the low voltage battery and so on, and that step-ups the output voltage of the low voltage battery and supplies it to the electricity storage device 11, and so on. A lead-acid battery whose rated voltage is 12 V may be used as the low voltage battery. It would also be acceptable to use, as the low voltage battery, a lithium ion battery or a nickel-hydrogen battery that has the same voltage.

When this hybrid automobile 1 is on power running (such as during starting off from rest, acceleration, normal traveling and so on) and the operation of the power conversion device 9 is controlled according to a command supplied by the control device 10 for provision of positive torque, the DC power stored in the electricity storage device 11 is converted into three phase AC power by the power conversion device 9, and this AC power is supplied to the motor-generator 7. Due to this, the motor-generator 7 generates rotational power for driving the vehicle. This rotational power that is generated is transmitted to the wheel axles 3 via the driving power changeover device 8, the transmission 5, and the differential gear 4, and thus drives the drive wheels 2.

On the other hand, when this hybrid automobile 1 is on regenerating (such as during deceleration, braking, and so on) and the operation of the power conversion device 9 is controlled according to a command supplied by the control device 10 for provision of negative torque, three phase AC power generated from the motor-generator 7 that is being driven by the rotational power of the drive wheels 2 is converted into DC power, and this DC power is supplied to the electricity storage device 11. Due to this, the electricity storage device 11 is charged up by this converted DC power.

The control device 10, along with calculating a current command values from a torque command value outputted from a higher ranking control device (not shown in the figures), also calculates a voltage command values on the basis of the difference between this current command values and the actual current flowing in the power conversion device 9, generates a PWM (Pulse Width Modulation) signal on the basis of this voltage command value that has been calculated, and outputs this PWM signal to the power conversion device 9.

—Overall Structure of the Electricity Storage Device 11—

Next, an energy supply system for a motor that can be applied to an electric automobile or to a hybrid type automobile, and that is provided with the electricity storage device 11 that includes a cell control device according to the present invention, will be explained with reference to FIG. 2.

Figure 2:
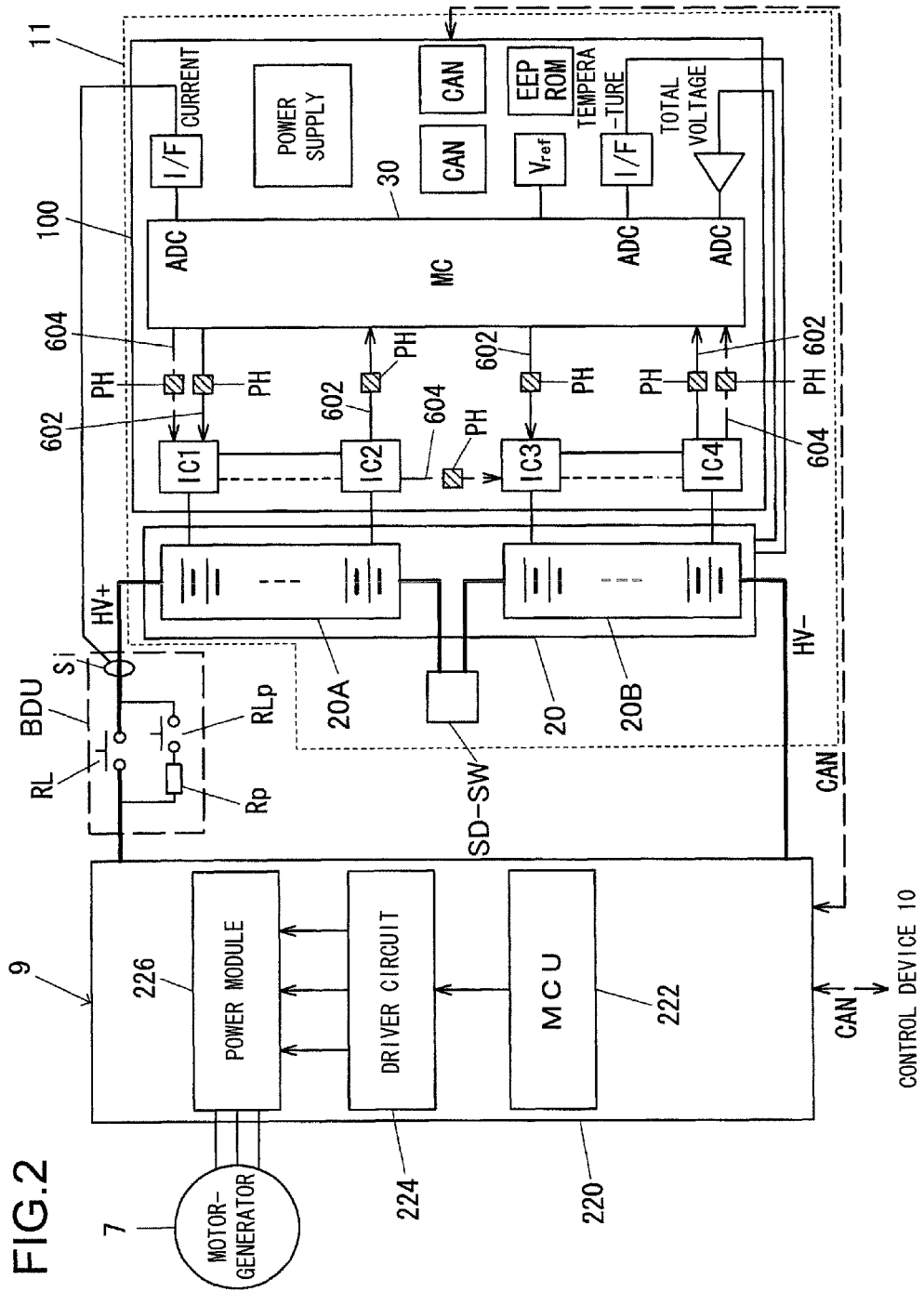
FIG. 2 is a block diagram showing an example of a drive system for a rotating electrical machine for a vehicle, that can be applied to an electric automobile (or to a hybrid type automobile) equipped with an electricity storage device including a cell control device according to the present invention.

FIG. 2 is a block diagram showing an energy supply system for a rotating electrical machine for a vehicle. The energy supply system shown in FIG. 2 includes a battery module 20, a cell control device 100 that monitors the battery module 20, an inverter device 220 that converts DC electrical power from the battery module 20 into three phase AC electrical power, and the motor-generator 7 for driving the vehicle. The motor-generator 7 is driven by the three phase AC electrical power from the inverter device 220. The inverter device 220 and the cell control device 100 are connected together by CAN communication, and the inverter device 220 functions as a higher ranking controller for the cell control device 100. Moreover, the inverter device 220 also operates on the basis of command information from the control device 10 (refer to FIG. 1).

The inverter device 220 includes a power module 226, an MCU 222 that provides overall control of the inverter device 220, and a driver circuit 224 for driving the power module 226. The power module 226 converts DC power supplied from the battery module 20 into three phase AC power for driving the motor-generator 7 as a motor. Although this feature is not shown in the figures, it should be understood that a smoothing capacitor of high capacity such as around 700 μF to around 2000 μF is provided between high power lines HV+ and HV− that are connected to the power module 226. This smoothing capacitor operates to reduce voltage noise reaching various integrated circuits that are provided to the cell control device 100.

In the state in which the operation of this inverter device 220 starts, the charge in this smoothing capacitor is approximately zero, so that, when a relay RL closes, a large initial current flows into the smoothing capacitor. And there is a fear that the relay RL might be fused by this large current, or might fail. In order to solve this problem, when starting the motor-generator 7, and according to a command from the control device 10, the MCU 222 changes over a pre-charge relay RLP from the opened state to the closed state and thereby charges up the smoothing capacitor, and thereafter changes over the relay RL from the opened state to the closed state, thus starting the supply of electrical power from the battery module 20 to the inverter device 220. During this pre-charging of the smoothing capacitor, the maximum current that can flow is limited with a resistor RP. By performing this type of operation, along with protecting the relay circuit, also it is possible to keep the maximum current flowing to the cells and to the inverter device 220 below some predetermined value, so that it is possible to maintain high security.

It should be understood that the inverter device 220 controls the phase of the AC power generated by the power module 226 for the rotor of the motor-generator 7 so that, during vehicle braking, the motor-generator 7 operates as a generator. In other words the inverter device 220 performs regenerative braking control, and charges up the battery module 20 by regenerating electrical power generated by generator operation and supplying this power to the battery module 20. If the state of charge of the battery module 20 has dropped below a reference state, then the inverter device 220 operates the motor-generator 7 as a generator. The three phase AC power generated by the motor-generator 7 is converted by the power module 226 into DC electrical power, and this is supplied to the battery module 20. As a result, the battery module 20 is charged up.

On the other hand, when the motor-generator 7 is to be operated as a motor to power-drive the vehicle, according to a command from the control device 10, the MCU 222 controls the driver circuit 224 and controls the switching operation of the power module 226, so as to create a rotating magnetic field in the advanced rotational direction, i.e. that leads the rotation of the rotor of the motor-generator 7. In this case, the DC power from the battery module 20 is supplied to the power module 226. Moreover, if the battery module 20 is to be charged up by regenerative braking control, then the MCU 222 controls the driver circuit 224 and controls the switching operation of the power module 226, so as to create a rotating magnetic field in the trailing direction, i.e. that lags the rotation of the rotor of the motor-generator 7. In this case, the AC electrical power from the motor-generator 7 is supplied to the power module 226, and the DC power from the module 226 is supplied to the battery module 20. As a result, the motor-generator 7 operates as a generator.

The power module 226 of the inverter device 220 performs power conversion between DC electrical power and AC electrical power by performing operation to go continuous and discontinuous at high speed. At this time, large voltage fluctuations are created by inductance in the DC circuitry, since high currents are intercepted at high speed. The above described high capacity smoothing capacitor is provided in order to suppress these voltage fluctuations.

Here, as an example, the battery module 20 consists of two battery module blocks 20A and 20B that are connected in series. Each of these battery module blocks 20A and 20B includes a plurality of cell groups connected in series, each of which includes a plurality of cells connected in series. The battery module block 20A and the battery module block 20B are connected in series via a service disconnector SD-SW for maintenance and inspection, in which a switch and a fuse are connected in series. The series electrical circuit can be intercepted by opening this service disconnector SD-SW, so that no current can flow, even supposing that an electrical connection has become established at some spot between somewhere upon one of the battery module blocks 20A and 20B and the vehicle. It is possible to maintain high security with this type of structure. Moreover, even if during inspection the operator should touch some point between HV+ and HV−, the situation is still safe, because high voltage is not applied to his body.

A battery disconnector unit BDU that is provided with the relay RL, the resistor RP, and the pre-charge relay RLP is fitted in the high voltage line HV+ between the battery module 20 and the inverter device 220. The series circuit of the resistor RP and the pre-charge relay RLP is connected in parallel with the relay RL.

Principally, the cell control device 100 performs measurement of the cell voltage of each of the unit cells, measurement of the total voltage, measurement of the current, measurement of the cell temperatures, adjustment of the capacity of each of the unit cells, and so on. In order to fulfill these functions, this cell controller 100 is provided with a plurality of ICs (integrated circuits) for cell control. The plurality of cells that are provided within each of the battery module blocks 20A and 20B are divided into a plurality of cell groups, and each of these cell groups is provided with one cell controller IC that controls the cells included in that cell group.

It should be understood that the cell control device 100 is provided upon a single board. The electricity storage device 11 consists of this cell control device 100 and the battery modules 20, and is housed in a metallic case. As will be described hereinafter, the cell control device 100 and the battery modules 20 are connected together by voltage detection lines via a connection terminal (i.e. a connector) provided upon the board of the cell control device 100. These voltage detection lines are used for detecting the voltage of each of the unit cells that make up the battery modules, and also are used for performing discharge (balancing) of each of the unit cells. With the present invention, these voltage detection lines may also be used for performing charging. Normally, for each cell controller, these voltage detection lines are connected all together to the above described connection terminal by a single connector.

It will be supposed that each of the battery module blocks 20A and 20B includes three cell groups (denoted as 20A1 through 20A3 and 20B1 through 20B3). Each of the cell groups 20A1 and 20B1 includes four unit cells, while each of the cell groups 20A2, 20A3, 20B2, and 20B3 includes six unit cells. However, the number of cells included in each of the cell groups is not to be considered as being limited to four or to six; it would be acceptable for one or more cell groups to include three or fewer, five, or seven or more cells. For the cell controllers IC that are provided corresponding to each of the cell groups, devices are used that are designed to be able to handle cell groups including varying numbers of cells, and that can be adapted to be employed whether the number of cells included in the corresponding cell group is only one, or is two or more. Furthermore, in order to be able to provide the voltage and current that are required by an electric automobile or by a hybrid automobile, a plurality of cell groups may be connected in series or in series-parallel in each of the battery module groups described above, and moreover a plurality of the battery module blocks may be connected in series or in series-parallel.

Each of the cell controller ICs that control the various cell groups, i.e. each of IC1 through IC6, includes a communication system 602 and a one-bit communication system 604. Serial communication according to the daisy chain method via insulating elements PH (for example, photocouplers) with the microcomputer 30 that controls the battery modules 20 is performed by the communication system 602, in order to read in the cell voltage values and to transmit commands of various types. And the one-bit communication system 604 transmits an anomaly signal when cell overcharging has been detected. In the example shown in FIG. 2, the communication system 602 is divided into a higher ranking communication path to the cell controllers IC1, IC2, and IC3 of the battery module block 20A, and a lower ranking communication path to the cell controllers IC4, IC5, and IC6 of the battery module block 20B. In other words, the microcomputer 30 functions as a higher ranking control device for the cell controllers IC1 through IC6.

Each of the cell controller ICs performs anomaly diagnosis, and transmits an anomaly signal from its transmit terminal FFO, if it has itself decided that an anomaly is present, or if it has received an anomaly signal from a higher ranking cell controller IC at its receive terminal FFI. On the other hand, if the anomaly signal that it has been previously receiving at its receive terminal FFI ceases, or if it has itself decided that the anomaly that it previously had detected has ceased to be present, then it stops transmitting an anomaly signal from its transmit terminal FFO. In this embodiment, this anomaly signal is a one-bit signal.

Although the microcomputer 30 does not send an anomaly signal to the cell controllers, in order to diagnose whether or not the one bit communication system 604, that is the transmission path for anomaly signals, is operating correctly, the microcomputer 30 sends a test signal to the one-bit communication system 604, this being a pseudo-anomaly signal. Upon reception of this test signal, the cell controller IC1 sends an anomaly signal to the communication system 604, and this anomaly signal is received by the cell controller IC2. The anomaly signal is then transmitted in order from the cell controller IC2 through the cell controller ICs IC3, IC4, IC5, and IC6, and finally is returned to the microcomputer 30 from the last cell controller IC6. If the communication system 604 is operating normally, then this pseudo-anomaly signal that was transmitted from the microcomputer 30 is indeed returned to the microcomputer 30 via the communication system 604. It is possible to diagnose the communication system 604 by sending and receiving a pseudo-anomaly signal in this manner, and thereby the reliability of the system is enhanced.

A current sensor Si including a Hall element or the like is installed within the battery disconnector unit BDU, and the output of this current sensor Si is inputted to the microcomputer 30. Signals related to the total voltage and to the temperature of the battery module 20 are also inputted to the microcomputer 30, and each of these is measured by an A/D converter (ADC) of the microcomputer 30. Temperature sensors are provided at a plurality of locations within the battery module blocks 20A and 20B.

FIG. 3 is a figure showing certain circuits related to cell balancing for the battery module block 20A of FIG. 2, in other words, to the cell controllers IC1 through IC3 that adjust the SOC (State Of Charge) of each unit cell of the cell groups 20A1 through 20A3 and their peripheral circuitry. Although explanation thereof is omitted, it should be understood that a similar structure is provided for the cell block 20B. The 16 unit cells that are provided to the battery module block 20A are divided into the three cell groups 20A1 through 20A3 that include, respectively, four, six, and six unit cells, and the cell controllers IC1 through IC3 correspond to these cell groups, respectively.

It should be understood that the number of unit cells making up each of the battery module groups is not limited to being 16. Furthermore the number of unit cells making up each of the cell groups is not limited to being 4 or 6. The number of unit cells that makes up the battery module groups may be varied according to the design, on the basis of the required output of these battery modules. Furthermore, here the cell controllers IC1 through IC3 that control the cell groups are shown by way of example; while here it is arranged for one cell controller to be able to control up to six unit cells, if it is desired for the number of unit cells that makes up some cell group to be greater than six, then, by using a cell controller that is designed in accordance with this requirement, it is possible to implement such a cell group in which the number of unit cells included is greater than six.

The terminals CV1 through CV6 and GNDS (CV7) of IC1 are terminals for measuring the cell voltages of corresponding unit cells, and thus this IC is able to measure the cell voltages of up to six unit cells. In the case of IC2 and IC3 that actually do monitor six unit cells, resistors RCV are provided in the voltage measurement lines to each of their terminals CV1 through CV6, in order to protect these terminals and in order to limit the discharge currents for capacity adjustment. On the other hand, in the case of IC1 that only monitors four unit cells, resistors RCV are provided in the voltage measurement lines to each of its terminals CV3 through CV6 only, in order to protect these terminals and in order to limit the discharge currents for capacity adjustment. Each of these voltage measurement lines is connected to the positive electrode or to the negative electrode of its cell BC via a voltage detection line SL. It should be understood that the GNDS terminals of IC2 and IC3 are connected to the negative electrodes of the unit cell BC6. For example, when measuring the cell voltages of the unit cells BC1 of the cell modules 20A2 and 20A3, the voltages between the terminals CV1 and CV2 are measured. Moreover, when measuring the cell voltage of the unit cells BC6, the voltages between the terminals CV6 and GNDS are measured. However, in the case of the cell module 20A1, the cell voltages of the unit cells BC1 through BC4 are measured by using the terminals CV3 through CV6 and GNDS (CV7) of the cell controller IC1. Capacitors Cv and Cin are provided between the voltage measurement lines as countermeasures against noise.

In order to exploit the performance of the battery modules 20 to the maximum limit, it is necessary to equalize the cell voltages of the 32 unit cells. For example, if the variation of the cell voltages is great, then during regenerative charging it is necessary to stop the regeneration operation at the time point that the voltage of the cell whose voltage is highest reaches an upper limit voltage. In this case, the regeneration operation is stopped irrespective of whether or not the cell voltages of the other cells have reached the upper limit voltage, so that energy starts to be wasted by braking operation since the regeneration operation has been stopped. In order to prevent this kind of occurrence, according to commands from the microcomputer 30, each of the ICs performs discharging of the unit cells that it controls in order to adjust the capacities of those unit cells. As shown in FIG. 3, each of IC1 through IC3 includes balancing switches BS1 through BS6 for cell capacity adjustment, provided between the pairs of terminals CV1 and BR1, BR2 and CV3, CV3 and BR3, BR4 and CV5, CV5 and BR5, and BR6 and GNDS. For example, when performing discharge of the unit cell BC1 of IC1, the balancing switch BS3 of IC1 is turned ON. When this is done, a balancing current flows along the path from the positive electrode of the unit cell BC1 to the negative electrode of the unit cell BC1 via the resistor RCV, the terminal CV3, the balancing switch BS3, the terminal BR3, and the resistor RB. The resistors RB and RBB are resistors for balancing.

The communication systems 602 and 604 are provided between IC1, IC2, and IC3, as described above. Communication commands from the microcomputer 30 are inputted to the main communication system 602 via a photocoupler PH, and are received at the receive terminal LIN1 of IC1 via the main communication system 602. And data and/or commands according to these communication commands are transmitted from the transmit terminal LIN2 of IC1. Moreover, communication commands that are received at the receive terminal LIN1 of IC2 are transmitted from its transmit terminal LIN2. Reception and transmission are performed in order in this manner, and thereby transmitted signals are transmitted from the transmit terminal LIN2 of IC3, and are received at a receive terminal of the microcomputer 30 via a photocoupler PH. According to these communication commands that they have received, IC1 through IC3 transmit measured data such as cell voltages and so on to the microcomputer 30, and perform operation for balancing. Moreover, each of IC1 through IC3 detects cell overcharging on the basis of the measured cell voltages. The results of this detection (i.e. anomaly signals) are transmitted to the microcomputer 30 via the signal system 604.

—Structure of a Cell Controller IC—

FIG. 4 is a figure schematically showing the internal block structure of the cell controller IC1 shown in FIG. 3, this being one of the ICs for cell control, and shows, as an example, the cell controller IC1 to which the four unit cells BC1 through BC4 of the cell group 20A1 are connected. While the explanation thereof is omitted, it should be understood that the other ICs have similar structures. Moreover, as described above, the number of unit cells that can be included in each of the cell groups is not to be considered as being limited to four. This cell controller IC is designed so as to be able to handle various numbers of unit cells included in its cell group. For example, while six balancing switches are provided in this cell controller IC1 shown in FIG. 4 so as to be able to handle six unit cells, if (as in this case) only four unit cells are included in the corresponding cell group to which this cell controller IC1 is connected, then only four among these six balancing switches are used.

As cell state detection circuitry, the cell controller IC1 is provided with a multiplexer 120 and an analog to digital converter 122A, an IC control circuit 123, a diagnosis circuit 130, transmission input circuits 138 and 142, transmission output circuits 140 and 143, a start circuit 254, a timer circuit 150, a control signal detection circuit 160, a differential amplifier 262, and an OR circuit 288.

The terminal voltages of the unit cells BC1 through BC4 are inputted to the multiplexer 120 via voltage detection lines SL1 through SL5 (corresponding to the lines SL in FIG. 3) and via the voltage input terminals CV3 through CV6 and the terminal GND (CV7). The multiplexer 120 selects an appropriate pair from the voltage input terminals CV3 through CV6 and GND, and inputs the voltage between that pair of terminals to the differential amplifier 262. The output of the differential amplifier 262 is inputted to the analog to digital converter 122A and is converted to a digital value. This digital value obtained by conversion, that represents the voltage between the selected pair of terminals, is sent to the IC control circuit 123 and is stored in an internal data storage circuit 125. The terminal voltages of the unit cells BC1 through BC4 that are inputted to the voltage input terminals CV3 through CV6 and GND (CV7) are biased, with respect to the GND potential of the cell controller IC1, by potentials based upon the terminal voltages of the unit cells that are connected in series. The influence of the above described biasing potentials is eliminated by the differential amplifier 262 described above, so that analog values based upon the terminal voltages of the unit cells BC1 through BC4 are inputted to the analog to digital converter 122A.

Along with being endowed with a calculation function, the IC control circuit 123 includes the data storage circuit 125, a timing control circuit 126 that periodically performs voltage measurement and state diagnosis, and a diagnosis flag storage circuit 128 for diagnosis flags set from the diagnosis circuit 130. The IC control circuit 123 decodes the contents of the communication commands inputted from the transmission input circuit 138, and performs processing according to the details thereof. These commands may include, for example, commands requesting measured voltage values between the terminals of the unit cells, commands that request discharge operation for adjusting the states of charge of the unit cells, commands to start the operation of the ICs of the cell controller ("wake-up" commands), commands to stop their operation ("sleep" commands), commands requesting address setting, and so on.

On the basis of the measured values from the IC control circuit 123, the diagnosis circuit 130 performs diagnosis of various types, such as diagnosis of overcharge and diagnosis of over-discharge. The data storage circuit 125 may, for example, be a register circuit that stores the voltages that have been detected between the terminals of the unit cells BC1 through BC4 in correspondence with these unit cells BC1 through BC4, and that also stores other detected values in addresses determined in advance, in such a state that they are capable of being read out.

Power supply voltages VCC and VDD of at least two types are used in the internal circuitry of the cell controller IC1. In the example shown in FIG. 4, the voltage VCC is the voltage of the battery module block that consists of the unit cell groups 20A1, 20A2, and 20A3 that are connected in series, while the voltage VDD is generated by a constant voltage power supply 134. The multiplexer 120 and the transmission input circuits 138 and 142 for signal transmission operate upon the voltage VCC, this being the higher voltage. On the other hand, the analog to digital converter 122A, the IC control circuit 123, the diagnosis circuit 130, and the transmission output circuits 140 and 143 for signal transmission operate on the voltage VDD, this being the lower voltage.

The signal received at the receive terminal LIN of the cell controller IC1 is inputted to the transmission input circuit 138, and the signal received at the receive terminal FFI is inputted to the transmission input circuit 142. The transmission input circuit 142 has a similar circuit structure to that of the transmission input circuit 138. And the transmission input circuit 138 includes a circuit 231 that receives a signal from another adjacent cell controller IC, and a circuit 234 that receives a signal from a photocoupler PH.

As shown in FIG. 4, in the case of the highest ranking cell controller IC1, the signal from the photocoupler PH is inputted to its receive terminal LIN1, while, in the case of the cell controller IC2, the signal from the adjacent IC1 is inputted to its receive terminal LIN1. Due to this, which of the circuits 231 and 234 is to be used is selected by the changeover device 233 on the basis of a control signal supplied to a control terminal CT of FIG. 4. This control signal supplied to the control terminal CT is inputted to a control signal detection circuit 160, and the changeover device 233 performs its changeover operation according to a command from the control signal detection circuit 160.

In other words, when a signal from the higher ranking controller (i.e. the microcomputer 30) is inputted to the receive terminal LIN1 of the cell controller IC that is highest ranking among the cell controller ICs in the direction of transmission, i.e. of the cell controller IC1, then the changeover device 233 closes its lower contact point, and the output signal of the circuit 234 is outputted from the transmission input circuit 138. On the other hand, when a signal from an adjacent controller IC is inputted to the receive terminal LIN1 of a lower ranking cell controller IC that is not the highest ranking one among the cell controller ICs in the direction of transmission, then the changeover device 233 closes its upper contact point, and the output signal of the circuit 232 is outputted from the transmission input circuit 138. And, in the case of the cell controller IC2, since the signal from the adjacent IC1 is inputted to the transmission input circuit 138, accordingly the changeover device 233 closes its upper contact point. Since the peak values of the output waveforms at the output from the higher ranking controller (i.e. the microcomputer 30) and at the output from the transmit terminal LIN2 of the adjacent cell controller IC are different, accordingly the threshold values for decision are different. Due to this, it is arranged to change over the changeover device 233 of the circuit 138 on the basis of the control signal at the control terminal TC. It should be understood that a similar structure is provided for the communication system 604 as well.

Communication commands received at the receive terminal LINT are inputted to the IC control circuit 123 via the transmission input circuit 138. And the IC control circuit 123 outputs data and/or commands according to communication commands that have thus been received to the transmission output circuit 140. This data and/or commands are transmitted from the transmit terminal LIN2 via the transmission output circuit 140. It should be understood that the transmission output circuit 143 has a similar structure to that of the transmission output circuit 140.

The signal received at the terminal FFI is used for transmitting notification of an anomalous state (such as an overcharge signal). When a signal indicating an anomaly is received from the terminal FFI, this signal is inputted to the transmission output circuit 143 via the transmission input circuit 142 and an OR circuit 288, and is outputted from the transmission output circuit 143 via the terminal FFO. Furthermore, when an anomaly is detected by the diagnosis circuit 130, irrespective of the signal contents received at the terminal FFI, a signal denoting an anomaly is inputted to the transmission output circuit 143 from the diagnosis flag storage circuit 128 via the OR circuit 288, and is outputted from the transmission output circuit 143 via the terminal FFO.

When a transmitted signal arrives from the adjacent cell controller IC or from the photocoupler PH and is received by the start circuit 147, the timer circuit 150 operates, and the voltage VCC is supplied to the constant voltage power supply 134. Due to this operation, the constant voltage power supply 134 goes into the operational state, and outputs the constant voltage VDD. And, when this constant voltage VDD is outputted from the constant voltage power supply 134, the cell controller IC2 transits from its sleep state to its wake state.

When balancing is to be performed, in a similar manner to that explained in connection with FIG. 3, the balancing switches corresponding to the unit cells are turned ON, and balancing is performed due to the provision of the circuits consisting of the unit cells, the resistors RCV, and the resistors RB or RBB. It should be understood that, in the example shown here, as described above, each of the cell controller ICs is built so as to be able to control up to six unit cells. Since the cell group 20A1 consists of four unit cells, accordingly in FIG. 4 the drawing is abbreviated so as to show control of four unit cells.

The balancing switches BS3 through BS6 are provided within the cell controller IC1 for adjusting the charge amounts of the unit cells BC1 through BC4 respectively. In the actual cell controller IC1, PMOS switches are used for the balancing switches BS3 and BS5, while NMOS switches are used for the balancing switches BS4 and BS6.

The opening and closing of these balancing switches BS3 through BS6 is controlled by a discharge control circuit 132. On the basis of a command from the microcomputer 30, a command signal for making the balancing switch corresponding to a cell that is to be discharged is sent to the discharge control circuit 132 from the IC control circuit 123. The IC control circuit 123 receives by communication from the microcomputer 30 commands for discharge time periods corresponding to each of the unit cells BC1 through BC4, and executes the discharge operation described above.

FIG. 5 is a schematic figure for comparison with the present invention, showing the circuitry of FIG. 4 with the portions other than the cell balancing circuitry omitted, and shows circuitry that is in common with the prior art. The voltage detection circuit 311 corresponds to the circuitry from the multiplexer MUX 120 of FIG. 4 to the IC control circuit 123.

The voltage detection lines SL1 through SL5 are respectively connected to the positive and negative electrodes of the unit cells BC1 through BC4 and to connection terminals (i.e. connectors) CN1 through CN5 that are provided on the board of the cell control device 100. These voltage detection lines lead into voltage detection lines SLB1 through SLB5 within the cell control device that are respectively connected between the connection terminals CN1 through CN5 and the connection terminals CV3 through CV7 of the cell controller IC1. The cell voltage of each of the unit cells is detected via circuits that are constituted by low resistances provided between these voltage detection lines SL1 through SL5 and SLB1 through SLB5, and between the voltage detection lines SLB1 through SLB5, respectively, and discharge (i.e. balancing) of each of the unit cells is also performed via these voltage detection lines, as described above.

However, in FIG. 5, capacitors Cbr for preventing the ingress of noise are also provided to the circuit shown in FIG. 4. Due to the provision of these capacitors Cbr and the resistors RCV, it becomes possible for noise mixed into the cell voltages of the unit cells inputted at the terminals CV3 through CV6 to be eliminated, and it becomes possible to measure the cell voltage of each of the unit cells in an accurate manner.

Yet further, an altered structure for the balancing resistors is provided in order to prevent the entry of high current pulses from the direction of the battery module 20 into the cell controller IC1. Each of the balancing resistors RB and RBB in FIG. 4 is divided into two resistors RB1, RB2 and RBB1, RBB2, and, due to the balancing resistors RB2 and RBB2 being disposed between the capacitors Cbr and the terminals BR3 through BR6, no direct capacitor coupling is present between the terminals BR3 through BR6 and the input terminals CN2 through CN5, since the balancing resistors RB2 and RBB2 are quite certainly interposed therebetween. Due to this, the balancing resistors RB2 and RBB2 are also interposed in the path for large transient currents from the cell side as well, so that it is possible to prevent entry of high current pulses into the cell controller IC1, and thus it is possible to prevent damage to the IC1 and failure thereof.

—The Cell Control Device According to the Present Invention—

Figure 6:
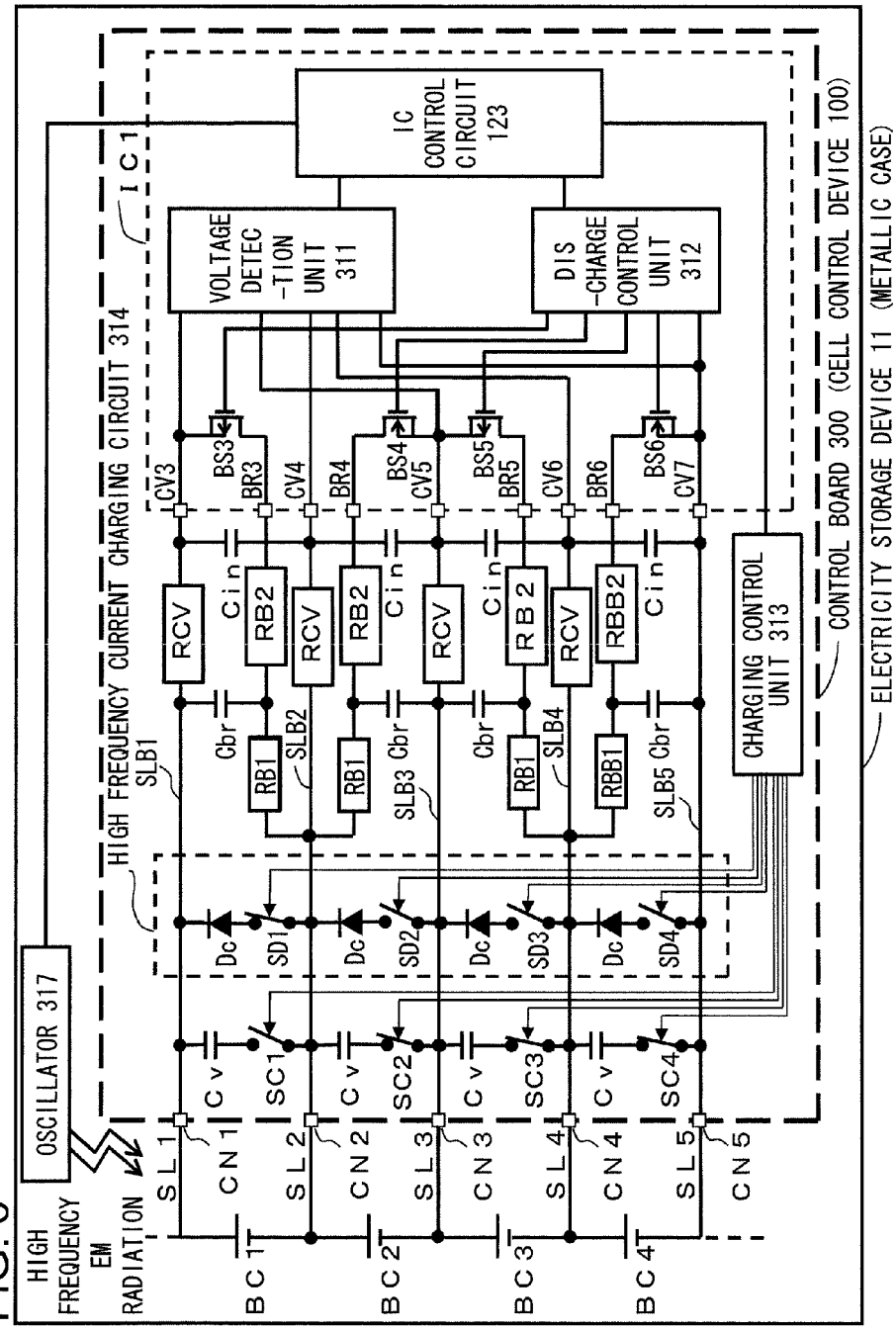
FIG. 6 is a schematic figure showing a cell balancing circuit having a cell balancing function that performs both charging and discharging, and that is used in the cell control device according to the present invention.

FIG. 6 schematically shows the circuitry of the cell control device according to the present invention. In FIG. 5, the capacitors Cv were provided as noise countermeasures near to the connection terminals CN1 through CN5, between adjacent pairs of the voltage detection lines SLB1 through SLB5. By contrast, with the circuit of the cell control device according to the present invention shown in FIG. 6, switches SC1 through SC4 are provided in series with each of these capacitors Cv for noise countermeasures. Moreover, a series circuit consisting of a diode Dc and a switch SD1 through SD4 is provided between adjacent pairs of the voltage detection lines SLB1 through SLB5 respectively, in parallel with each of the series circuits consisting of a capacitor Cv and one of the switches SC1 through SC4. The turning ON and OFF of the switches SC1 through SC4 and of the switches SD1 through SD4 is controlled by the charging control unit 313, and the charging control unit 313 is controlled by the IC control circuit 123.

While the entire electricity storage device 11 is housed within a metallic case, an oscillator 317 is provided that generates high frequency electromagnetic radiation within this metallic case, so that the high frequency electromagnetic radiation generated by this oscillator 317 irradiates the voltage detection lines SL1 through SL5. The turning of this oscillator 317 ON and OFF is controlled by the cell controller IC1, and in concrete terms is controlled by the IC control circuit 123.

Figure 7:
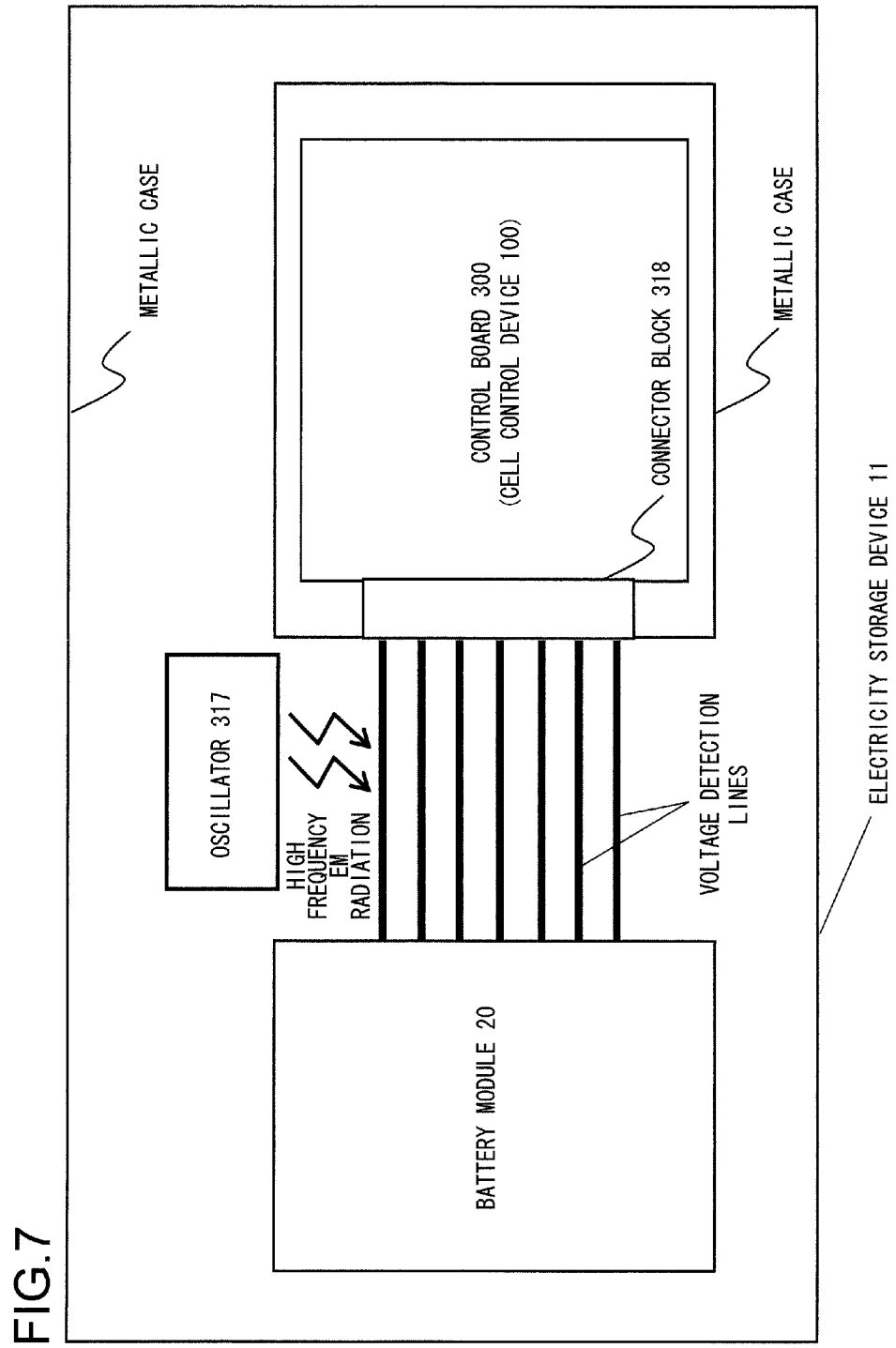
FIG. 7 is a schematic figure for when charging is being performed using the cell control device according to the present invention.

FIG. 7 shows the way in which the voltage detection lines irradiated by this high frequency electromagnetic radiation are arranged in an easily understandable manner. The voltage detection lines that connect between the battery module and the connector block 318 of the cell control device 100 are bundled together into a harness, and the high frequency electromagnetic radiation from the oscillator 317 irradiates this harness.

In normal operation for performing charging and discharging (this being per se the same as in the prior art), the switches SC1 through SC4 are in the closed state and the switches SD1 through SD4 are in the opened state, and operation is performed in the same manner, per se, as in the case of the prior art circuitry shown in FIG. 5. However, according to a command from the microcomputer 30 (refer to FIG. 2) that is a higher ranking control device, changing over between the above described normal operation and operation according to the present invention, and along therewith control of the switches SC1 through SC4 and of the switches SD1 through SD4 by the charging control unit 313, is performed by the IC control circuit 123. It should be understood that it would also be possible to arrange for this control of changing over between normal operation and operation according to the present invention, control of the charging control unit, and control of the oscillator to be performed directly from the microcomputer 30 that is the higher ranking control device. Moreover, it would also be possible for the charging control unit 313 to be provided as a section of the circuitry within the cell controller IC1.

Figure 9:
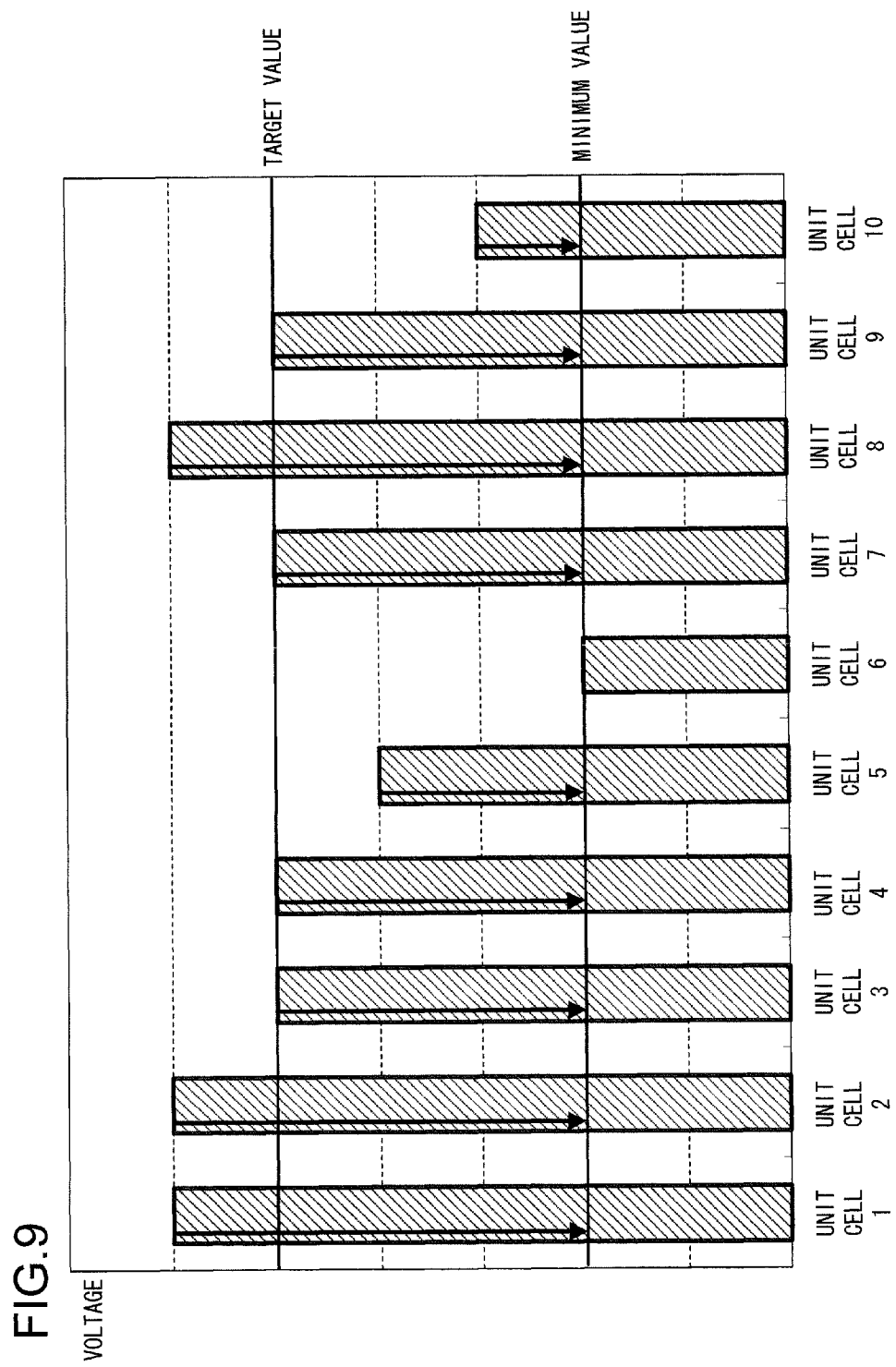
FIG. 9 is a figure showing, in the exemplary state of SOC of the cell group shown in FIG. 8, a method of adjusting the SOCs (i.e. the voltages) when cell balancing is performed only by discharge, as in the prior art.
Figure 10:
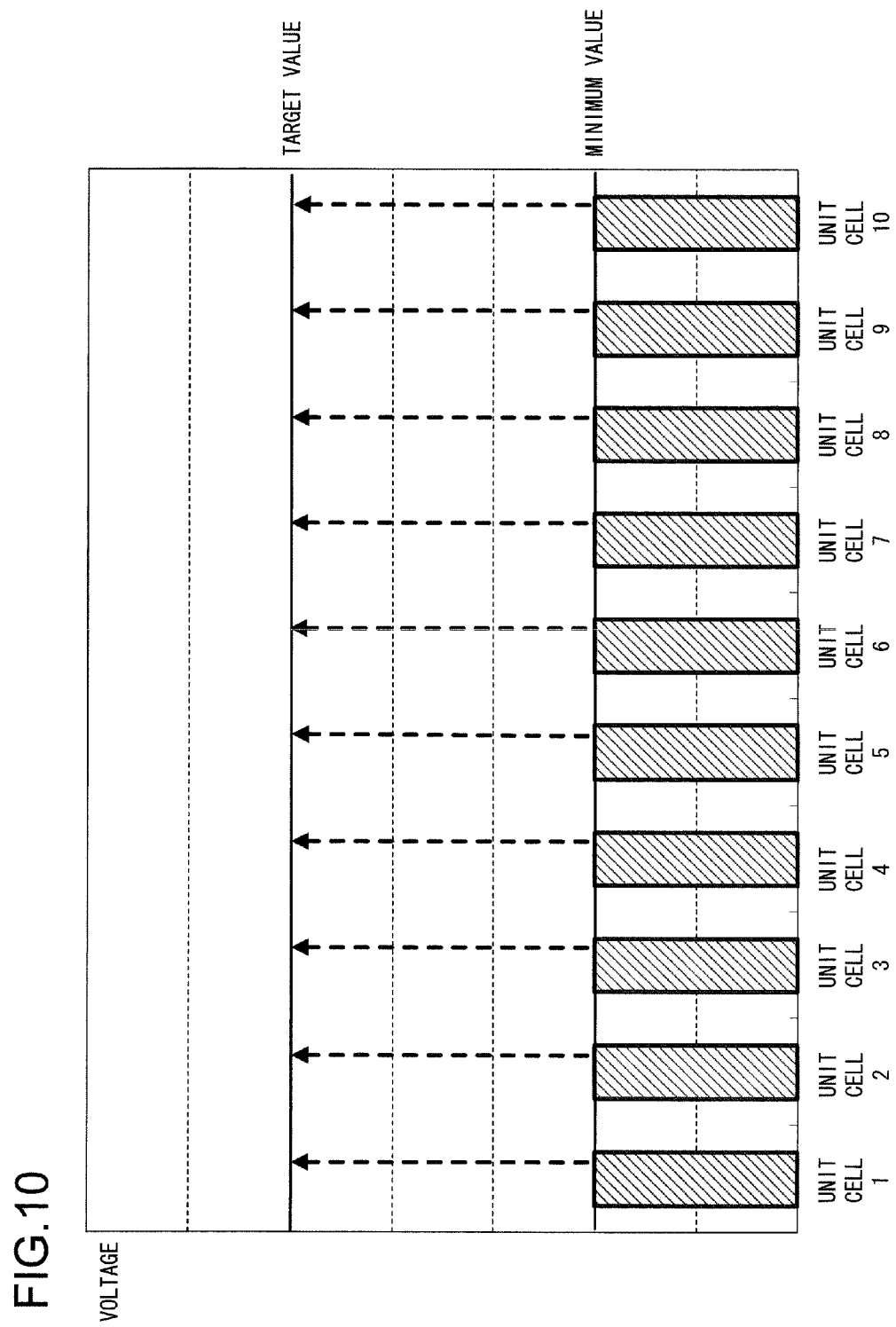
FIG. 10 is a figure showing a method of charging according to the prior art, in which charging of all of the unit cells is performed all together, after the cell balancing by discharge only shown in FIG. 9 according to the prior art.
Figure 11:
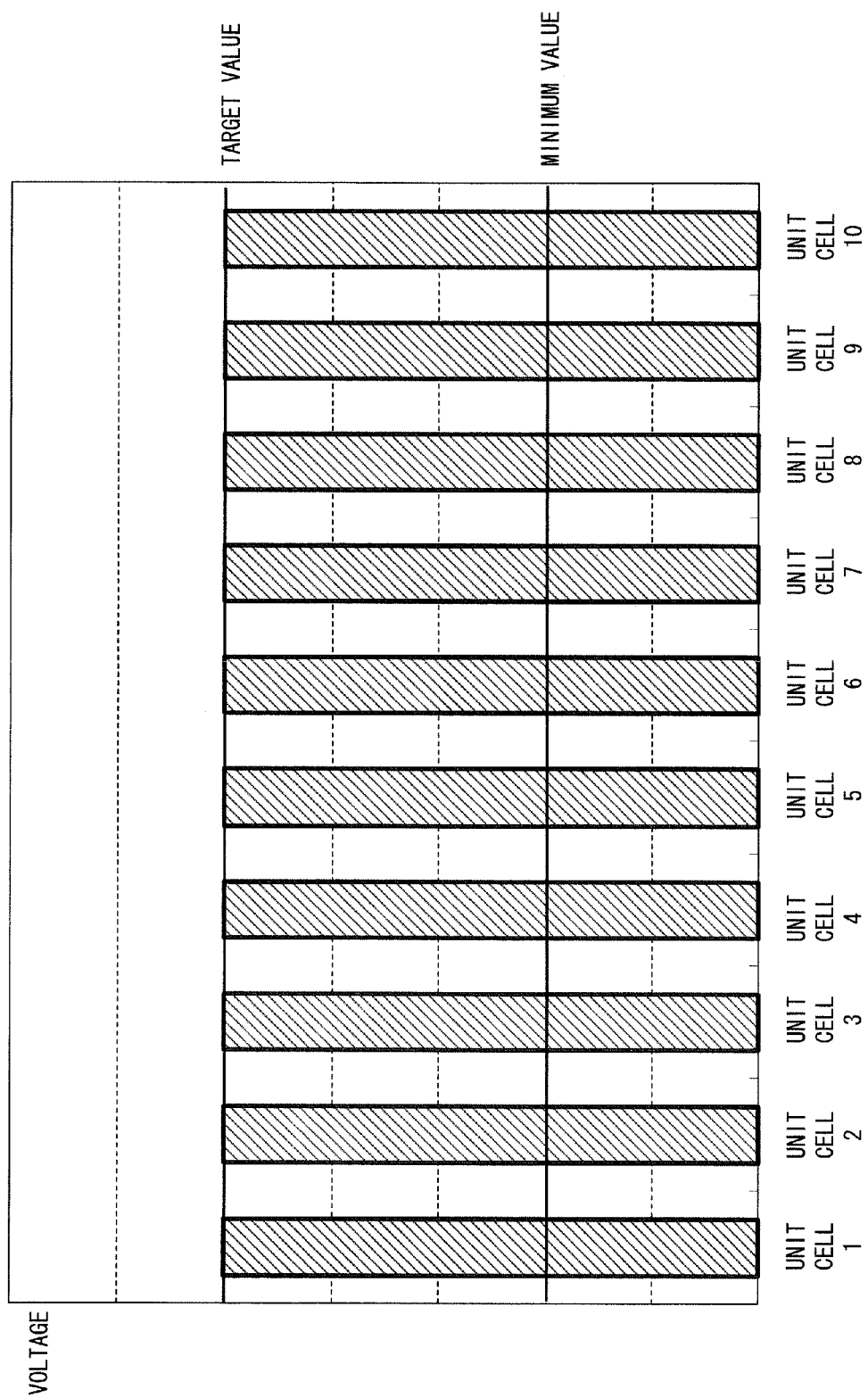
FIG. 11 is a figure showing an example of the states of SOC of all of the unit cells, after cell balancing has been performed by the charging and discharging shown in FIGS. 8 and 9.

The charging and discharging operation of this cell group using the cell control device 100 according to the present invention will now be explained with reference to FIGS. 8 through 15. It should be understood that FIGS. 9 through 11 show the charging and discharging operation according to the prior art for comparison with the present invention. Moreover, FIGS. 8 through 14 describe the charging and discharging operation for a cell group that consists of ten unit cells, and the vertical axis in each of these figures shows the SOC (i.e. the voltage) of each of the unit cells before and after the charging and discharging operation, or its voltage change. Since the actual magnitude of the voltages depends upon the type of cell that is used, no particular scale is shown for the vertical axis in these figures.

Figure 8:
FIG. 8 is a figure showing, as an example, a state of the SOCs (i.e. the voltages) of unit cells, for an example in which a cell group consists of ten unit cells.

FIG. 8 shows an example of the states of charge (i.e. the SOCs) of each of the unit cells in the cell group described above that is made up from ten unit cells, at some time point. It should be understood that the vertical axis shows the SOCs, i.e. the terminal voltages of the unit cells. These terminal voltages are obtained by the differences in electrical potential between adjacent pairs of the voltage detection lines being detected by the voltage detection circuit 311; in the example shown in FIG. 5, for example, the terminal voltage of the unit cell BC1 is obtained by detecting the difference in electrical potential between the voltage detection lines SL1 and SL2. This difference in electrical potential between the voltage detection lines SL1 and SL2 is corrected by a correction coefficient stored in the IC control circuit 123 or in the microcomputer 30 (refer to FIG. 2) that is the higher ranking control circuit, due to the existence of a slight amount of voltage drop that can be ascribed to the resistors RCV that are provided in the voltage detection lines SL1 and SL2.

Since, as described above, with the prior art method, when there is variation between the SOCs of the various unit cells of a cell group, the operation of regeneration stops when the SOC of that unit cell whose SOC is the highest reaches the upper limit value, accordingly regenerated energy is not effectively utilized. Moreover, the discharge capacity as a cell group is reduced, and the service life is also shortened. Accordingly, as shown in FIG. 8, it is desirable to correct such variation by performing charging and discharging of the unit cells in response to variation of the SOCs of the unit cells, so as to bring the SOCs of all the unit cells to the target value. Even if lithium ion cells are employed as the unit cells, although their output voltages vary due to the qualities of the material used for their electrodes, the target value described above is set to ordinary between 3.3 V to 4.0 V, and accordingly this is taken as being the rated output voltage of the lithium cells.

For correction of the variation between the unit cells of the cell groups according to the prior art technique, first, the states of charge are made uniform by performing discharge from the states of the cells shown in FIG. 8. FIG. 9 shows the situation in which the SOC of the lowest unit cell (in FIGS. 8 and 9, the unit cell #6) is taken as a target, and the other unit cells are discharged so as to match that cell having the lowest SOC.

Next, as shown in FIG. 10, charging is performed for all of the unit cells in this cell group up to the target voltage value, so that the state shown in FIG. 11 is reached.

Figure 12:
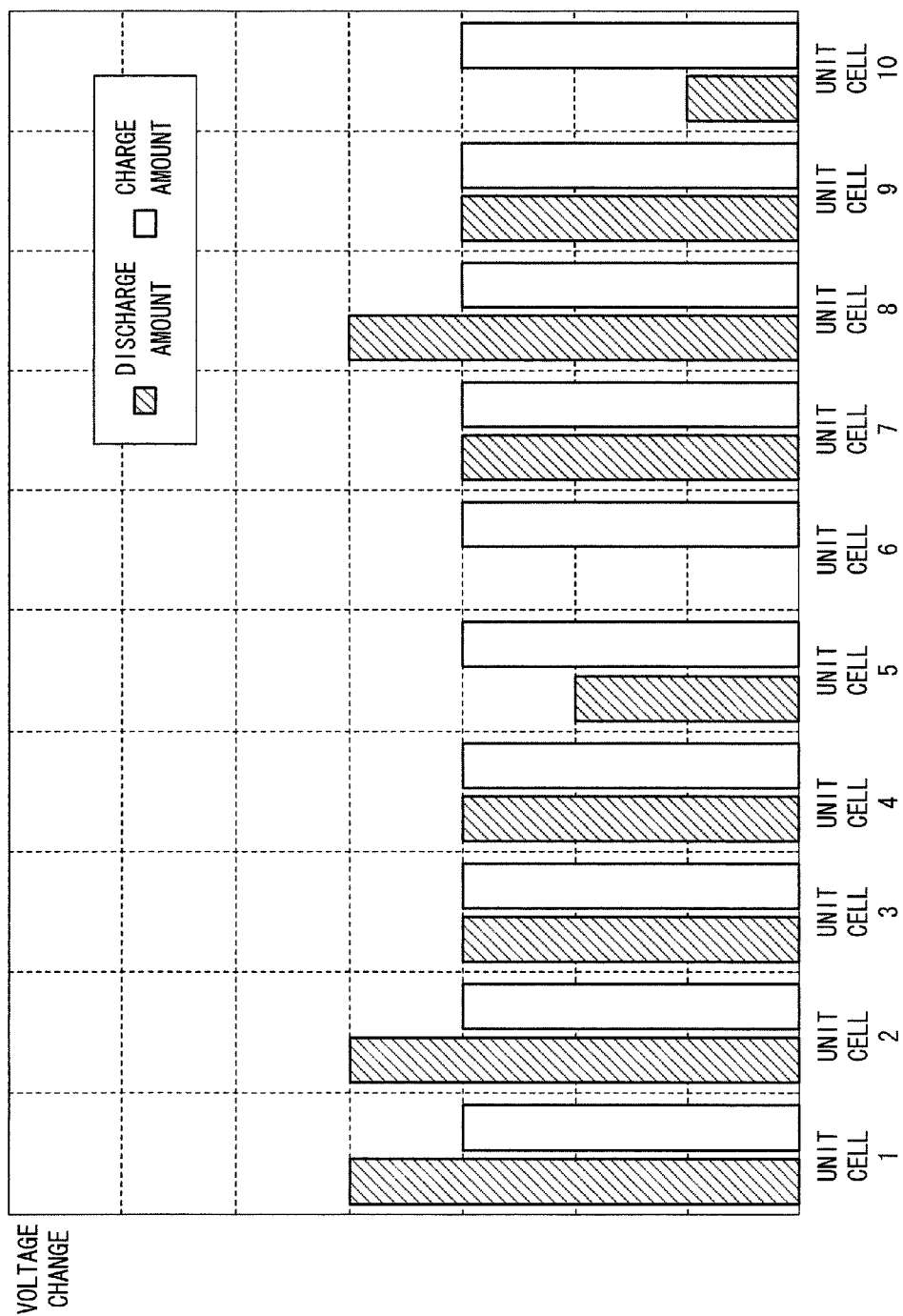
FIG. 12 is a figure showing the amounts of change of the voltages of the unit cells in the cell group of FIG. 8, when equalization of the SOCs (i.e., of the voltages) has been implemented by performing cell balancing by charging and discharging according to the prior art.

When correction of variation of the SOCs of the unit cells in the cell group is performed according to the prior art method described above, the amounts of charging and discharging of the unit cells come to be as shown in FIG. 12. As is clear from FIGS. 8, 9, and 11, with this prior art method, the unit cells having voltages close to the target value (i.e. the unit cells #3, #4, #7, and #9) and the unit cells having voltages greater than the target value (i.e. the unit cells #1, #2, and #8) are temporarily discharged to a state that is the same as that of the unit cell #6.

Figure 13:
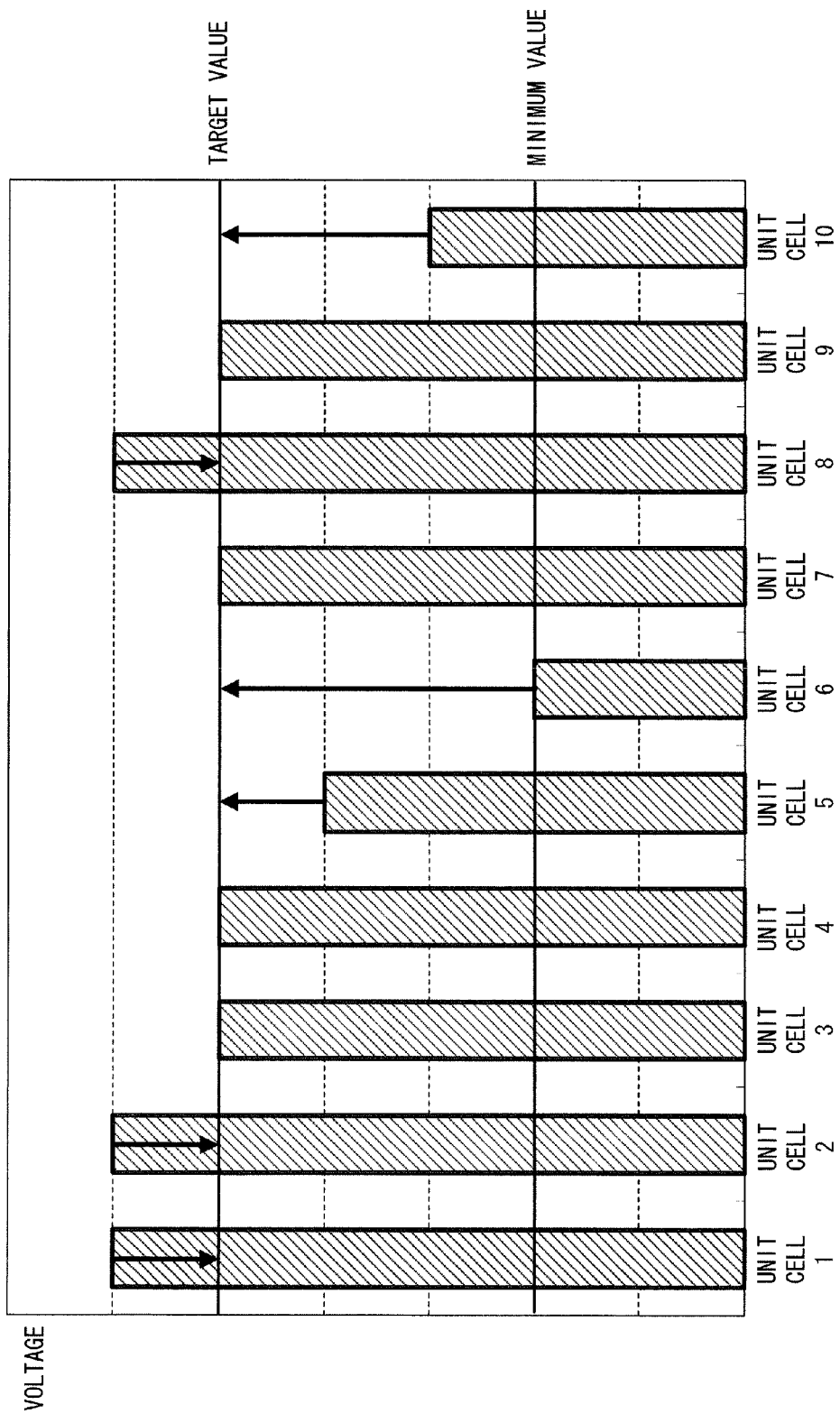
FIG. 13 is a figure showing, for the example of the cell group shown in FIG. 8, a method of adjusting the SOCs (i.e. the voltages) when cell balancing is performed using both discharging and also charging, according to the present invention.

FIG. 13 shows the corrections for variation of the unit cells in the cell group, when the cell control device according to the present invention is employed. Discharge is performed for those unit cells whose voltage is higher than the target voltage value (i.e. the unit cells #1, #2, and #8), so that their voltages become equal to the target value. Moreover, according to the method of the present invention, charging is performed for each of the unit cells whose voltage is lower than the target voltage value (i.e. the unit cells #5, #6, and #10). And neither charging nor discharging is performed for those unit cells whose voltage is already close to the target voltage value (i.e. the unit cells #3, #4, #7, and #9).

Figure 14:
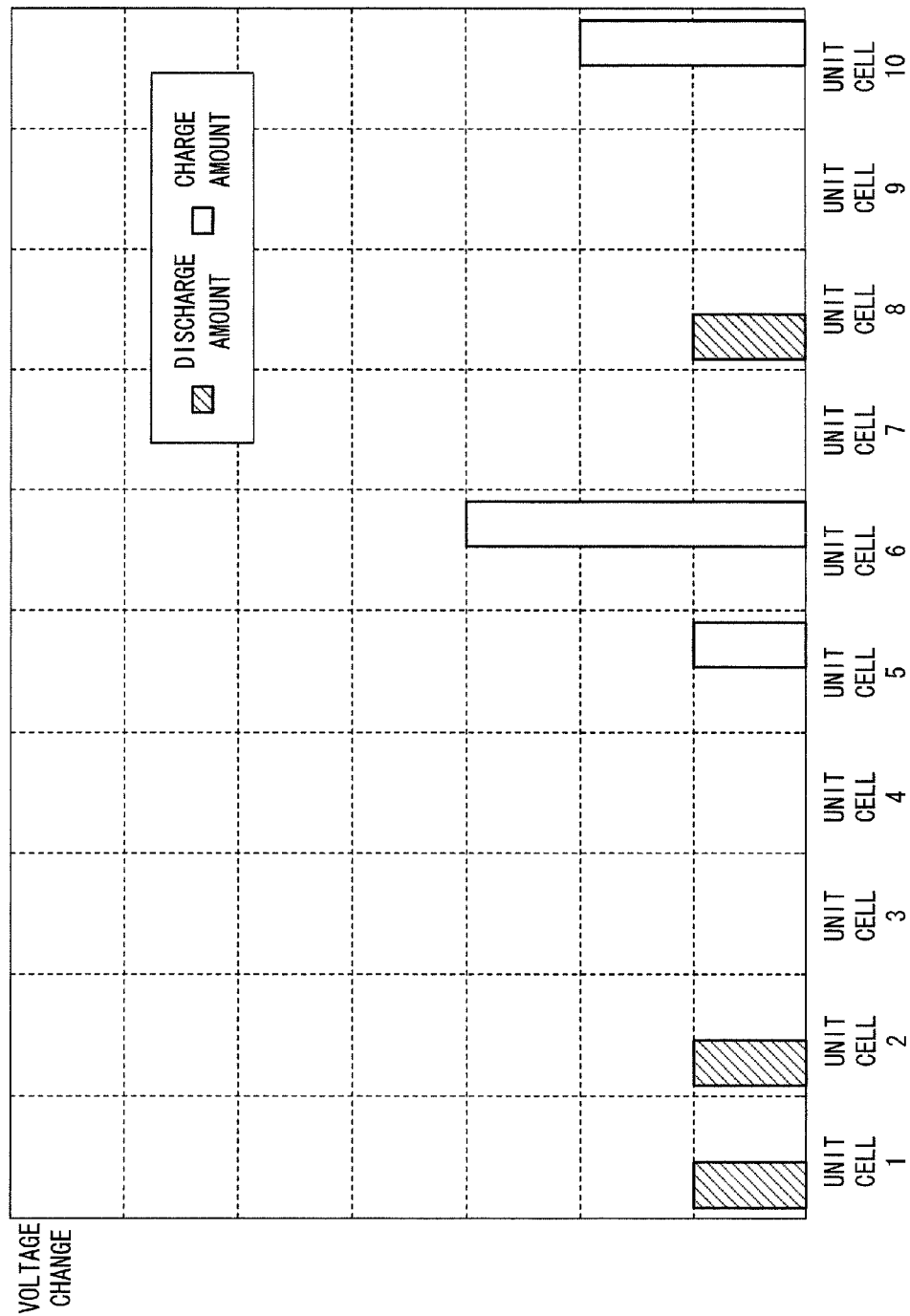
FIG. 14 is a figure showing the amounts of change of the voltages of the unit cells of FIG. 9, when equalization of the SOCs (i.e., of the voltages) has been implemented by performing cell balancing according to the present invention.

The amounts of charging and discharging of the unit cells when correction of variation of the SOCs of the unit cells in the cell group has been performed using the cell control device according to the present invention become as collectively shown in FIG. 14. When this is compared with the prior art method shown in FIG. 12, it will be clearly understood that the amounts of charging and discharging are reduced.

—Charging and Discharging Control Using the Cell Control Device According to the Present Invention—

A method for charging and discharging a cell group that consists of N unit cells, using the cell control device according to the present invention, will now be explained with reference to FIGS. 15 through 17. It should be understood that, in the following explanation, reference will be made to FIGS. 6, 7, 13, and 14 as appropriate. Moreover, it should be understood that the cell group shown by way of example in FIG. 6 is built up from four unit cells, whereas each of the cell groups shown in the examples of FIGS. 7, 13, and 14 is built up from ten unit cells.

In the prior art, discharge of the unit cells in order to perform correction of variation between the unit cells was performed when the vehicle was stopped (and the key switch thereof was turned OFF), and the same is the case for the cell control device according to the present invention as well: it also performs its operation when the vehicle is stopped. However, as will be described hereinafter, in the prior art method described above, charging was performed for all of the unit cells at the same time when the vehicle was being operated, whereas, if the cell control device according to the present invention is employed, in addition to this charging method that was performed in the prior art, charging of each of the unit cells individually is also performed when the vehicle is stopped (i.e. when the key switch thereof is OFF). In other words, with the present invention, for each of the unit cells individually, both charging and discharging are performed using the cell control device according to the present invention while the vehicle is stopped.

Figure 15:
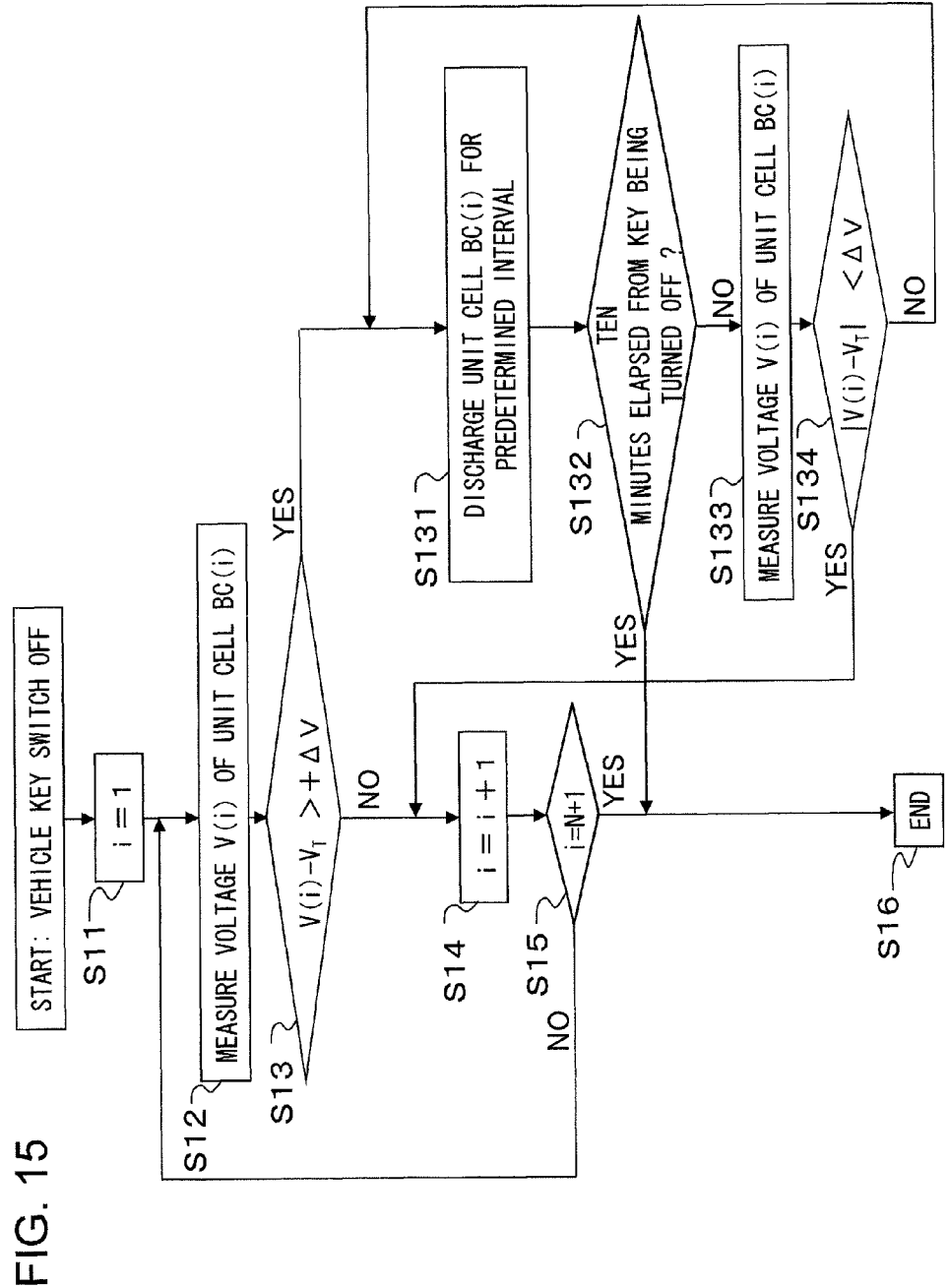
FIG. 15 is a flow chart showing balancing discharge operation, when a cell control device that is endowed with a cell balancing function according to the present invention is employed.

—The Discharge Method Using the Cell Control Device According to the Present Invention FIG. 15 is a flow chart showing a method for discharging those unit cells in an overcharge state among the unit cells in a cell group that consists of N unit cells (the i-th unit cell is called BC(i), where i=1,N), when the cell control device according to the present invention is employed.

After the vehicle has stopped, the SOC (i.e. the voltage) of each of the unit cells in the cell group is measured individually, and those cells that are overcharged are discharged so that they attain the target value of voltage VT. It should be understood that when this discharge operation starts (i.e. when the key switch of the vehicle is turned OFF), all of the switches SC1 through SC4 shown in FIG. 6 are closed (i.e. ON), while all of the switches SD1 through SD4 are open (i.e. OFF). Moreover, it should also be understood that when, as in FIG. 6 described above, the cell group consists of four unit cells, then in FIGS. 7 through 14 these switches are provided in the same number as their corresponding unit cells; in other words, ten thereof are provided.

In a step S11 a variable i is set to unity, and then in a step S12 the voltage V(i) of the i-th unit cell BC(i) is measured (the first time round this loop, i=1). Then in a step S13 the measured voltage value V(i) of this unit cell BC(i) is compared with a target voltage value VT, and if V(i) is greater than the target value VT by more than a predetermined value $\Delta V$ then it is determined that discharge is required, and the flow of control is transferred to a step S131. On the other hand, if the measured voltage V(i) is less than or equal to the target voltage value VT+$\Delta V$, then it is determined that discharge is unnecessary, and the flow of control proceeds to a step S14.

In the step S14 the value of i is incremented by one (i.e. i=i+1), and in the next step S15, if i=N+1, then this discharge operation terminates (a step S16), since voltage measurement for all of the unit cells of the cell group and the required discharging for these unit cells has been completed.

However if in the step S13 it has been decided that it is necessary to discharge the unit cell BC(i), then in the step S131 the operation of the cell control device changes over to operation to discharge this unit cell BC(i). At this time, the switch that corresponds to BC(i) in the balancing switches as shown in FIG. 6 (in FIG. 6, BS3 through BS6) is turned ON for performing this discharge. It should be understood that if the cell group consists of ten unit cells as shown in FIGS. 7 through 13, then ten or more balancing switches are provided in the cell controller IC1, so that it is possible to discharge each of up to ten unit cells individually. Moreover, the turning ON and OFF of these balancing switches is performed by the cell controller IC1, and these balancing switches are all turned to OFF until this discharge operation starts.

After discharge for a predetermined time interval has been performed, in this step S131, the balancing switch that discharges the unit cell BC(i) is turned to OFF, and the flow of control proceeds to a step S132. Here, a further discharge operation is stopped when ten minutes has elapsed from when this discharge operation starts (i.e. from when the key switch of the vehicle is turned OFF). In other words, the flow of control is transferred to the step S16. This is because it is supposed that the charging and discharging operation using the cell control device according to the present invention is performed a little at a time after the vehicle stops. While the electrical power required for the charging and discharging operation explained here is not great, if it is performed over a long time period, then the consumption of electrical power does become significant. Accordingly, if the amount of electrical power required for the charging and discharging operation is not large, then the charging and discharging operation may be continued longer ten minutes.

Moreover, the above described predetermined time period for discharge is set to a time period of an order during which, due to this discharge, the SOC (i.e. the voltage) of a unit cell will become less than or equal to the target voltage value VT+$\Delta V$. This type of predetermined time period can be forecast simply and easily from the internal resistance (i.e. the SOH) of each of the unit cells and its measured voltage (i.e. its SOC). While the internal resistance of each of the unit cells may be obtained from the output current of this cell group and the measured voltage of that unit cell, here the explanation of these details is omitted. Accordingly, as the predetermined value for the above described discharge time period, a value that is forecast for each unit cell may be set for each unit cell; or alternatively, for example, the time period taken by the unit cell that is discharged most quickly to discharge by $\Delta V$ from VT+$\Delta V$ may be obtained, and a time period of length equal to or less than this time period may be used as the discharge time period for all of the unit cells.

However when, in the step S132, the elapsed time from the start of the discharge operation is less than or equal to ten minutes, the flow of control proceeds to a step S133. In this step S133 the voltage of the unit cell BC(i) is measured, in a similar manner to the procedure in the step S12. Next in a step S134, if the difference between the voltage V(i) measured here and the target voltage value VT is greater than $\Delta V$, then the flow of control returns to the step S131, and discharge is performed again. But if the difference between the measured voltage V(i) and the target voltage value VT is less than $\Delta V$, then the flow of control is transferred to the step S14.

By doing the above, discharge of those unit cells that were overcharged is performed. If, in the example described above, discharge for all of the unit cells in the cell group has not been completed after ten minutes from the start of discharge, then, while it is possible to store this state in the memory of the cell controller IC1 or of the microcomputer 30, and to continue performing discharge from the unit cells that were in the overcharged state the next time that discharge is performed, further explanation thereof will here be omitted.

—The Charging Method Using the Cell Control Device According to the Present Invention—

Figure 16:
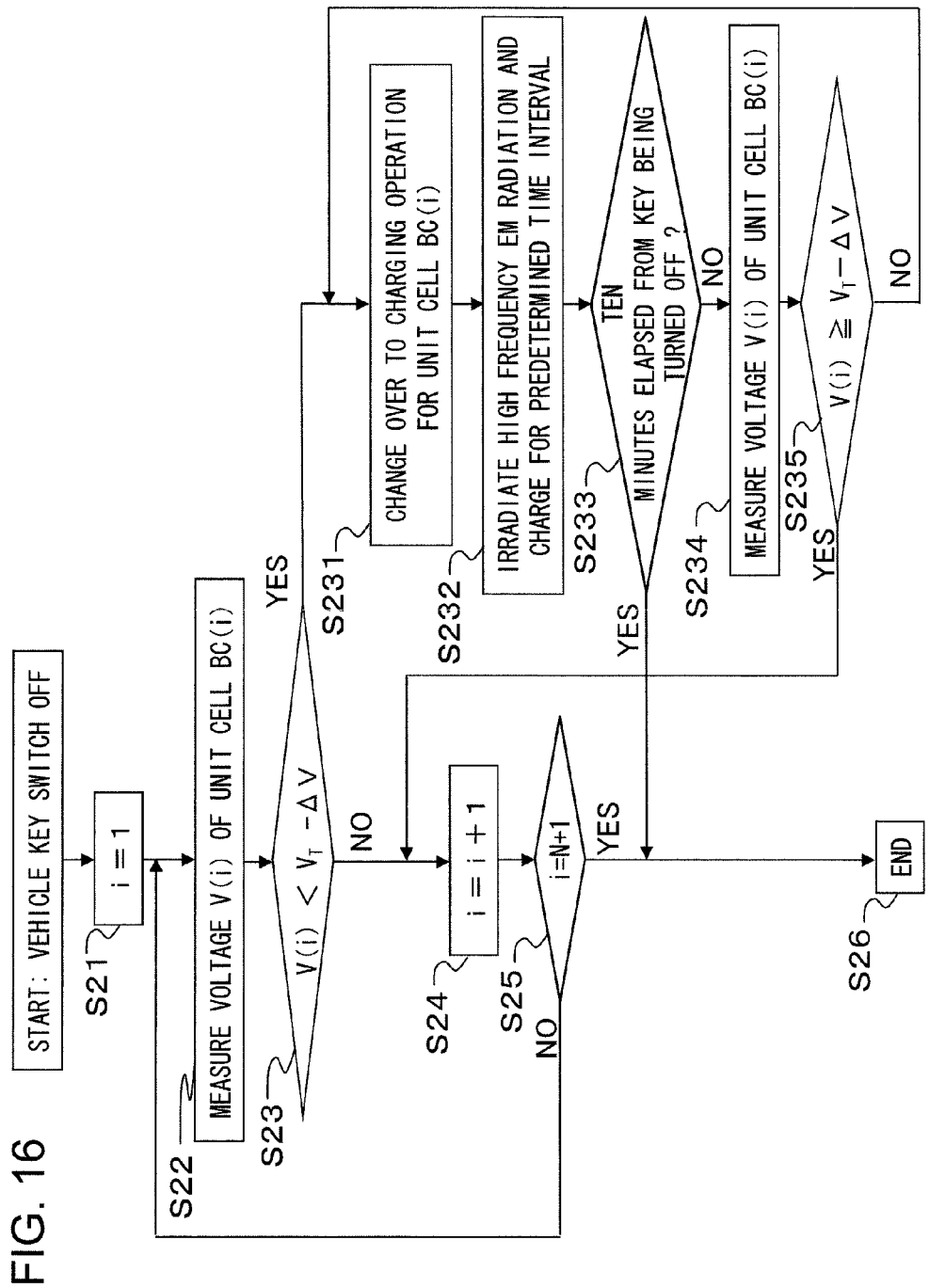
FIG. 16 is a flow chart showing charging operation, when a cell control device that is endowed with a cell balancing function according to the present invention is employed.

FIG. 16 is a flow chart showing a method for charging those unit cells in an over-discharged state among the unit cells in a cell group that consists of N unit cells (the i-th unit cell is called BC(i), where i=1,N), when the cell control device according to the present invention is employed.

After the vehicle has stopped, the SOC (i.e. the voltage) of each of the unit cells in the cell group is measured individually, and those cells that are over-discharged are charged up, so that they attain the target value of voltage VT. It should be understood that when this charging operation starts (i.e. when the key switch of the vehicle is turned OFF), in the same manner as when the discharge process described above starts, all of the switches SC1 through SC4 shown in FIG. 6 are closed (i.e. ON), while all of the switches SD1 through SD4 are open (i.e. OFF). Moreover, it should also be understood that when, as in FIG. 6 described above, the cell group consists of four unit cells, then in FIGS. 7 through 14 these switches are provided in the same number as their corresponding unit cells; in other words, ten thereof are provided.

In a step S21 a variable i is set to unity, and then in a step S22 the voltage V(i) of the i-th unit cell BC(i) is measured. Then in a step S23 the measured voltage value V(i) of this unit cell BC(i) is compared with the target voltage value VT, and if V(i) is less than the target value VT−$\Delta V$, then it is determined that charging up is required, and the flow of control is transferred to a step S231. On the other hand, if the measured voltage V(i) is greater than or equal to VT−ΔV, then it is determined that charging up is unnecessary, and the flow of control proceeds to a step S24.

In the step S24 the value of i is incremented by one (i.e. i=i+1), and in the next step S25, if i=N+1, then this charging operation terminates (a step S26), since voltage measurement for all of the unit cells of the cell group and the required charging for these unit cells has been completed.

However if in the step S23 it has been decided that it is necessary to charge up the unit cell BC(i), then in the step S231 the operation of the cell control device changes over to operation to charge up this unit cell BC(i). At this time, for performing this charging, the switch that corresponds to BC(i) in the switches SC1 through SC4 as shown in FIG. 6 is turned OFF, while the switch that corresponds to BC(i) in the switches SD1 through SD4 is turned ON. It should be understood that if the cell group consists of ten unit cells as shown in FIGS. 7 through 13, then the capacitors Cv and the switches that are connected in series with them shown in FIG. 6 (SC1 through SC4 in FIG. 6) and the diodes Dc and the switches that are connected in series with them (SD1 through SD4 in FIG. 6) are provided in just the same number as the number of the unit cells; in other words, here, ten of each are provided (in the following explanation, the number of unit cells is taken as being N, so that i=1,N of the switches SC(i) and SD(i) are provided). Moreover it should be understood that, in FIG. 6, the switch SC1 is shown as being OFF and the switch SD1 is shown as being ON, so as to charge up the unit cell BC1. In a similar manner, when charging up the unit cell BC(i), the switch SC(i) that corresponds to this unit cell BC(i) is turned OFF, while the switch SD(i) is turned ON.

Next, in a step S232, the oscillator 317 that generates high frequency electromagnetic radiation is turned ON, and the high frequency electromagnetic radiation thus generated by the oscillator 317 is irradiated upon the voltage detection lines that are connected to the unit cell BC(i). These voltage detection lines are connected to the positive electrode and to the negative electrode of the unit cell, and the voltage detection line on the negative electrode side and the voltage detection line on the positive electrode side are also common to two consecutive ones of the unit cells. In the example shown in FIG. 6, the cell group consists of four unit cells, and so there are five voltage detection lines (SL1 through SL5). Since here it is supposed that the cell group consists of N unit cells, accordingly the total of voltage detection lines connected to them is N+1. These voltage detection lines may be termed SL(i), where i=1,N+1. The voltage detection line on the positive electrode side of the unit cell BC(i) is SL(i), while the voltage detection line on its negative electrode side is SL(i+1).

As also explained in FIG. 7, the N+1 voltage detection lines SL(1) through SL(N+1) are bundled together into a harness, and the above described high frequency electromagnetic radiation is irradiated upon this bundled harness. Although this high frequency electromagnetic radiation that is thus irradiated is absorbed by all of the voltage detection lines, since all of their corresponding switches SC apart from the switch SC(i) corresponding to the unit cell BC(i) that is the subject to be charged up are ON, accordingly, except for the unit cell BC(i), the energy in the high frequency electromagnetic radiation that is absorbed is consumed simply by charging and discharging the capacitors Cv, so that it does not act to charge up those other unit cells.

By contrast, the switch SC(i) that corresponds to the unit cell BC(i) that is the subject to be charged up is OFF, and moreover the corresponding switch SD(i) is ON. Due to this, the high frequency electromagnetic radiation that is absorbed by the voltage detection lines SL(i) and SL(i+1) is rectified by the diode SD(i), and charges up the unit cell BC(i). After this charging has continued for a predetermined time interval, in the step S232, the oscillator 317 is turned OFF, the switch SD(i) is turned OFF, the switch SC(i) is turned ON, and then the flow of control proceeds to a step S233.

In the step S233, a further charging operation is stopped when, for example, ten minutes has elapsed from the time point that this charging operation started (i.e. from when the key switch of the vehicle was turned OFF). In other words, the flow of control is transferred to the step S26. This is because it is supposed that the charging and discharging operation using the cell control device according to the present invention is performed a little at a time after the vehicle has stopped. While the electrical power required for the charging and discharging operation explained here is not very great, if it is performed over a long time period, then the consumption of electrical power does become significant. Accordingly, if the amount of electrical power required for the charging and discharging operation is not large, then the charging and discharging operation may be continued longer than ten minutes.

Moreover, the above described predetermined time period for charging is set to a time period of an order during which, due to this charging by irradiation with the high frequency electromagnetic radiation, the SOC (i.e. the voltage) of the unit cell will become greater than or equal to the target voltage value VT−ΔV. As described above, this type of predetermined time period can be forecast simply and easily from the internal resistance (i.e. the SOH) of each of the unit cells and its measured voltage (i.e. its SOC), but explanation of this feature will here be omitted. Accordingly, as the predetermined value for the above described charging time period, a value that is forecast for each unit cell may be set for each unit cell; or alternatively, for example, the time period taken by the unit cell that is charged most quickly to charge up by ΔV from VT−ΔV may be obtained, and a time period of length equal to or less than this time period may be used as the charging time period for all of the unit cells.

However when, in the step S233, the elapsed time from the start of the discharge operation is less than or equal to ten minutes, then the flow of control proceeds to a step S234. In this step S234 the voltage of the unit cell BC(i) is measured, in a similar manner to the procedure in the step S22. Next in a step S235, the voltage V(i) measured here and the target voltage value VT are compared together, and if V(i)<VT−ΔV, then the flow of control returns to the step S231, and charging is performed again. But if V(i)≥VT−ΔV, then the flow of control is transferred to the step S24.

Charging up of those unit cells that were over-discharged is performed as described above. If, in the example described above, charging for all of the unit cells in the cell group that required to be charged has not been completed after ten minutes from the start of charging, then, while it is possible to store this state in the memory of the cell controller IC1 or of the microcomputer 30, and to continue performing charging into the unit cells that were in the over-discharged state the next time that charging is performed, further explanation thereof will here be omitted.

Furthermore, it would be acceptable to execute the above described charging operation directly after the above described discharge operation; or it would also be acceptable to execute them separately.

—A Variant Embodiment of the Charging Method Using the Cell Control Device According to the Present Invention—

With the charging method employing the above described cell control device according to the present invention, the voltages were measured one at a time in the order of the N unit cells making up the cell group (i.e., in the example of FIG. 6, from the highest ranking unit cell BC1), these measured voltages V(i) were compared with the target voltage VT, and, if one of them was smaller by more than the predetermined value ΔV, then it was determined that charging was required, and charging was performed.

However, in the example shown in FIG. 17, it is arranged first to perform this decision as to whether charging is required or not for all of the N unit cells included in the cell group, and then, among those unit cells for which it has been decided that they should be subjects of charging, to perform charging starting with that unit cell whose SOC (i.e., voltage) is the lowest. Description of those portions of the operation that are the same as in the case of charging described in FIG. 16 above are here curtailed or omitted.

In a step S31 variables i and j are set to unity, and then in a step S22 the voltage V(i) of the i-th unit cell BC(i) of the cell group is measured. Then in a step S33 the measured voltage value V(i) of this unit cell BC(i) is compared with the target voltage value VT, and if V(i)<VT−ΔV, then it is determined that charging up is required, and the flow of control is transferred to a step S331 in order to construct a list of the unit cells for which charging is to be performed. On the other hand, if the measured voltage V(i)≥VT−ΔV, then it is determined that charging up is unnecessary, and the flow of control proceeds to a step S34.

In the step S34 the value of i is incremented by one (i.e. i=i+1), and in the next step S35, if i=N+1, then the flow of control proceeds to a step S36, since this operation of voltage measurement for all of the unit cells of the cell group and creation of a list of those unit cells for which charging is required has been completed.

If j=1 in the step S36, since the initial value of j has not changed during the flow of this program, and since therefore there are no unit cells for which charging is required, accordingly it is determined that no charging operation is required, and this program terminates (at a step S37).

If in the step S33 V(i) is smaller than VT by more than the predetermined value ΔV and it is decided that charging is required, then the flow of control is transferred to the step S331, in which a list L(j) that specifies the numbers of the unit cells for which charging up is required is constructed. The number i of the j-th unit cell for which it has been decided by this program that charging is required is stored in the list L(j) as L(j)=i. Next in a step S332 the value of j is incremented by unity (j=j+1), and then the flow of control proceeds to the step S34. The list constructed by the steps S31 through S35 above will be referred to as L(k), where k=1,j.

If in the step S36 it is determined that j is not equal to unity, in other words if j>1, then the flow of control is transferred to a step S361, since some unit cell is present for which charging is required. In the steps S361 through S369, for the unit cells BC(i) (where i=1,N), charging up is performed of those unit cells for which it has been decided that charging up is required, on the basis of the list L(n) (where n=1,j) of unit cells for which charging up is required that has been constructed as described above.

First, in the step S361, the list L(k) (where k=1,j) that has been constructed as described above is rearranged in order from that unit cell for which the state of over-discharge is the greatest, in other words in order from that unit cell whose SOC is smallest, so that a list L(n) (where n=1,j) is created.

And next in a step S362 the value of a variable ix is set to unity (i.e. ix=1), and then the flow of control proceeds to a step S363.

In this step S363, the operation of the cell control device changes over to operation to charge up this unit cell BC(i). At this time, the switch SC(L(ix)) is turned OFF, while the switch SD(L(ix)) is turned ON, so that charging is performed.

Next, in a step S364, the oscillator 317 that generates high frequency electromagnetic radiation is turned ON, and the high frequency electromagnetic radiation thus generated by the oscillator 317 is irradiated upon the voltage detection lines that are connected to the unit cell BC(L(ix)). The switch SC(L(ix)) that corresponds to the unit cell BC(L(ix)) that is to be the subject of charging is turned OFF, while the switch SD(L(ix)) is turned ON. Due to this, the high frequency electromagnetic radiation that is absorbed by the voltage detection lines SL(L(ix)) and SL(L(ix)+1) is rectified by the diode SD(L(ix)), and charges up the unit cell BC(L(ix)). After this charging has continued for a predetermined time interval, in the step S232, the oscillator 317 is turned OFF, the switch SD(L(ix)) is turned OFF, the switch SC(L(ix)) is turned ON, and then the flow of control proceeds to a step S365.

In the step S365, in a similar manner to that described in connection with the flow for charging shown in FIG. 16, the further charging operation is stopped when, for example, ten minutes has elapsed from the time point that this discharge operation started (i.e. from when the key switch of the vehicle was turned OFF). In other words, the flow of control is transferred to the step S37. This is because it is supposed that the charging and discharging operation using the cell control device according to the present invention is performed a little at a time after the vehicle has stopped. While the electrical power required for the charging and discharging operation explained here is not very great, if it is performed over a long time period, then the consumption of electrical power does become significant. Accordingly, if the amount of electrical power required for the charging and discharging operation is not large, then the charging and discharging operation may be continued longer than ten minutes. Moreover, the setting of the above described predetermined time period for charging is the same as that described in connection with the flow for charging shown in FIG. 16.

However when, in the step S365, the elapsed time from the start of the discharge operation is less than or equal to ten minutes, then the flow of control proceeds to a step S366. In this step S366 the voltage of the unit cell BC(L(ix)) is measured, in a similar manner to the procedure in the step S22. Next in a step S367, if the measured voltage V(L(ix)) and the target voltage value VT are compared together, and if V(L(ix))<VT−ΔV, then the flow of control returns to the step S363, and charging is performed again. But if the measured voltage V(L(ix))≥VT−ΔV, then the flow of control is transferred to a step S368.

Charging up of those unit cells that were over-discharged is performed as described above. It should be understood that, in a similar manner to that described in connection with the flow for charging shown in FIG. 16, if charging for all of the unit cells in the cell group that were required to be charged has not been completed after ten minutes from the start of charging, then, while it is possible to store this state in the memory of the cell controller IC1 or of the microcomputer 30, and to continue performing charging into the remaining unit cells that were in the over-discharged state the next time that charging is performed, further explanation thereof will here be omitted. Furthermore, it would be acceptable to execute the above described charging operation directly after the above described discharge operation; or it would also be acceptable to execute them separately.

It should be understood that while, in the explanation given above, the operations of measurement of the voltages of the unit cells, and of charging and discharging them, were performed for one unit cell at a time, it would also be possible to perform these operations for several of the unit cells at one time. However, since performing any of these operations upon one unit cell exerts some influence upon the neighboring unit cell or cells, it is preferable not to perform such an operation simultaneously upon more of the unit cells than alternate ones thereof, so that two adjacent cells are not operated upon simultaneously. While this type of simultaneous operation can be carried out in a similar manner to the operations of voltage measurement, charging, and discharging for one unit cell at a time described and explained above, description thereof will be omitted, since the program flow for performing such an operation is rather complicated, and could be supplemented by a person of ordinary skill in the relevant art based upon the disclosure herein.

It should be understood that while, in the above description, it was supposed that, in order to charge up each of the unit cells, the charging control unit 313 and the oscillator 317 were controlled by the cell controller IC1, it would also be acceptable for the charging control unit 313 and the oscillator 317 to be controlled by the microcomputer 30 (refer to FIG. 2), that is a higher ranking control device than the cell controller IC1. In this case, as explained with the aid of the flow chart of FIG. 17, first, the SOC (i.e. the voltage) of each of the unit cells is measured, and this measurement information is transmitted to the microcomputer 30, that is the higher ranking control device. The microcomputer 30 controls the charging control unit 313 and the oscillator 317 and performs charging on the basis of the voltage measurement information for each of the unit cells, in a similar manner to the case with the charging method described above. Since it would also be acceptable for the cell controllers to be put into the stopped state while the microcomputer 30 is performing charging, accordingly this procedure presents an advantageous aspect from the point of view of reduction of the power consumption.

Furthermore, while in the explanation of FIG. 15 given above it was described that, during discharge of the unit cells using the electricity storage device of the present invention, for one unit cell at a time, first the voltage of which unit cell was measured, and then discharge was performed if that voltage exceeded a predetermined standard value, alternatively, as explained in connection with the charging according to the variant of the present invention shown in FIG. 17, it would also be acceptable to arrange first to measure the voltages of all of the unit cells, and then to perform discharge of all the cells in order, starting from that cell for which the voltage value most exceeds the predetermined standard value.

As described above, with the cell control device according to the present invention, the balancing switches (in FIG. 6, BS3 through BS6) may be taken as being first switches, the switches that are provided in series with each of the diodes Dc (in FIG. 6, SD1 through SD4) may be taken as being second switches, and the switches that are provided in series with each of the capacitors Cv (in FIG. 6, SC1 through SC4) may be taken as being third switches: and the above described charging and discharging operation is performed by controlling these first, second, and third switches.

While, in the above description, the charging and discharging of the unit cells according to the present invention was explained as being performed when the vehicle is stopped (i.e. when the key switch of the vehicle is OFF), in relation to the discharge operation, since the electrical power of the electricity storage device is not being used for driving the vehicle if the vehicle is in the stopped state, accordingly it would also be possible to perform discharge of the unit cells before the key switch is turned OFF, in other words when the key switch is in the ON state. At this time, naturally, the measurement of the cell voltages of the unit cells is performed before discharge is started. Moreover, while it would also be possible to perform discharge of the unit cells in the state before the vehicle is driven and after the key switch has been turned ON, in this case, discharge would be performed according to, for example, the prior art method explained with reference to FIGS. 7 through 9, without any connection with the discharge method according to the present invention as explained in the above disclosure.

As described above, with the cell control device according to the present invention and the electricity storage device equipped therewith, the efficiency of utilization of energy when performing charging and discharging is improved, since the SOCs are balanced for each of the cells of the electricity storage device on a one by one basis.

The present invention is not limited to the embodiments and variant embodiments described above. Various modifications can be made without departing from the scope of the invention.

What is claimed is:

1. A cell control device, comprising:
   a discharge circuit, comprising first switches that select each of a plurality of unit cells that are connected in series, and that discharges the each unit cell selected by the first switches;
   a charging circuit, comprising second switches that select each of the plurality of unit cells that are connected in series, and that charges the each unit cell selected by the second switches;
   a voltage detection unit that detects a voltage of each unit cell via voltage detection lines respectively connected to positive electrodes and to negative electrodes of the plurality of unit cells;
   an oscillator that irradiates high frequency electromagnetic radiation upon the voltage detection lines; and
   a discharge control unit that controls opening and closing of the first switches, thereby performing discharge of the each unit cell, and a charging control unit that controls opening and closing of the second switches, thereby performing charging of the each unit cell, based on voltages of the plurality of the unit cells that are detected by the voltage detection unit.

2. A cell control device according to claim 1, wherein, for a unit cell for which it has been detected by the voltage detection circuit that the voltage of the unit cell is greater than a target value, the discharge control unit performs discharge while closing one of the first switches that corresponds to the unit cell whose voltage is greater than the target value; and, when there is a unit cell whose voltage detected by the voltage detection circuit is less than a target value, the charging control unit drives the oscillator, opens one of the first switches that corresponds to the unit cell whose voltage is less than the target value, closes the one of the second switches that corresponds to that unit cell, and charges up that unit cell.

3. A cell control device according to claim 1, further comprising; a protective circuit comprising third switches that select each of the plurality of unit cells, and that protects the each unit cell selected by the third switches; and wherein, when charging up the each unit cell, the charging control unit performs charging by opening the third switches.

4. A cell control device according to claim 1, wherein the cell control device further comprises a cell controller that includes the voltage detection unit and the discharge control unit, and that controls the voltage detection unit and the discharge control unit; and, when the charging control unit is charging the each unit cell, the cell controller performs charging by closing the first switches corresponding to the each unit cell.

5. A cell control device according to claim 4, wherein the cell controller controls the charging control unit.

6. A cell control device according to claim 1, wherein:
the cell control device further comprises a cell controller that includes the voltage detection unit and the discharge control unit, and that controls the voltage detection unit and the discharge control unit;
the charging control unit is controlled by a higher ranking control device of the cell controller; and
when the charging control unit is performing charging of the each unit cell, the cell controller is stopped.

7. A cell control device according to claim 1, wherein the discharge of the each unit cell by the discharge control unit and the charging of the each unit cell by the charging control unit are performed in key switch OFF state when a vehicle to which the cell control device is mounted is stopped.

8. A cell control device according to claim 1, wherein the discharge of the each unit cell by the discharge control unit is performed in key switch ON state when a vehicle to which the cell control device is mounted is stopped.

9. A cell control device according to claim 1, wherein:
voltages of all unit cells of the plurality of unit cells are detected; and
among those unit cells whose voltages are greater than a target value, discharge is performed from a unit cell with greatest voltage.

10. An electricity storage device, comprising; a cell control device according to claim 1, the plurality of unit cells connected in series, and a metallic case containing the cell control device and the plurality of unit cells.

11. A vehicle capable of traveling by electric driving, comprising; an electricity storage device according to claim 10 and an electric motor for driving that is powered by electrical power supplied from the electricity storage device.

* * * * *